(12) United States Patent
Toyokawa et al.

(10) Patent No.: US 6,829,367 B1
(45) Date of Patent: Dec. 7, 2004

(54) CONTENT DATA JUDGING APPARATUS

(75) Inventors: Kazuhara Toyokawa, Yamato (JP); Norishige Morimoto, Tokyo-To (JP); Satoko Tonegawa, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 589 days.

(21) Appl. No.: 09/595,222

(22) Filed: Jun. 16, 2000

(30) Foreign Application Priority Data

Jun. 22, 1999 (JP) ......................................... 11-1760947

(51) Int. Cl.⁷ ........................... G06K 9/00; H04N 7/167
(52) U.S. Cl. ..................................... 382/100; 380/202
(58) Field of Search ........................... 382/100; 380/202

(56) References Cited

U.S. PATENT DOCUMENTS

| | | | | |
|---|---|---|---|---|
| 5,499,294 A | * | 3/1996 | Friedman | 713/179 |
| 5,862,218 A | * | 1/1999 | Steinberg | 713/176 |
| 5,875,249 A | * | 2/1999 | Mintzer et al. | 380/54 |
| 6,005,936 A | * | 12/1999 | Shimizu et al. | 713/176 |
| 6,047,103 A | * | 4/2000 | Yamauchi et al. | 386/94 |
| 6,064,764 A | * | 5/2000 | Bhaskaran et al. | 382/183 |
| 6,175,639 B1 | * | 1/2001 | Satoh et al. | 382/100 |
| 6,233,684 B1 | * | 5/2001 | Stefik et al. | 713/176 |
| 6,257,486 B1 | * | 7/2001 | Teicher et al. | 235/380 |
| 6,269,446 B1 | * | 7/2001 | Schumacher et al. | 713/176 |
| 6,275,599 B1 | * | 8/2001 | Adler et al. | 382/100 |
| 6,504,941 B2 | * | 1/2003 | Wong | 382/100 |
| 6,633,653 B1 | * | 10/2003 | Hobson et al. | 382/100 |

FOREIGN PATENT DOCUMENTS

| | | | | |
|---|---|---|---|---|
| EP | 1 017 223 A2 | * | 5/2000 | H04N/1/21 |
| JP | PUPA 11-98344 | | 4/1999 | H04N/1/387 |

OTHER PUBLICATIONS

"Secure Copyright Protection Techniques for Digital Images", by A. Herrigel et al, Proc. 2nd Int. Information Hiding Workshop; Oregon, Apr. 15–17, 1998.

Technology Finder, Nikkei Multimedia, May 1998, No. 34, pp. 76–81.

Techniques for Data Hiding by W Bender et al., IBM Systems Journal, vol. 35, Nos. 3 & 4, 1996 pp. 313–336.

\* cited by examiner

*Primary Examiner*—Leo Boudreau
*Assistant Examiner*—Hussein Akhavannik
(74) *Attorney, Agent, or Firm*—L. Herzberg

(57) ABSTRACT

Content data is judged to determine whether data prepared by a digital device were altered by performing an authentication process using a medium on which content data are recorded; reading the content data from the medium; embedding, in the content data, data for verifying the pertinent content; extracting, from the content data, the data for verifying the pertinent contents; using the results of the extraction to determine whether the content data were altered. Preferably, the means includes means for identifying any portion containing altered data.

7 Claims, 28 Drawing Sheets

| DCT block number pair | Block 1 coefficient | | | Block 2 coefficient | | | Embedded data bit number | Embedded data assignment |
|---|---|---|---|---|---|---|---|---|
| | A1 | B1 | C1 | A2 | B2 | C2 | (1~96) | |
| 1 | 1 | 5 | 2 | 5 | 6 | 3 | 31 | 1 |
| 2 | 5 | 8 | 9 | 2 | 5 | 5 | 21 | 0 |
| 3 | 2 | 10 | 9 | 5 | 1 | 2 | 18 | 1 |
| 4 | 1 | 11 | 5 | 5 | 3 | 20 | 65 | 0 |
| 5 | 10 | 2 | 25 | 1 | 3 | 24 | 7 | 1 |
| ⋮ | ⋮ | ⋮ | ⋮ | ⋮ | ⋮ | ⋮ | ⋮ | ⋮ |
| 160 | 5 | 30 | 11 | 6 | 9 | 10 | 7 | 1 |
| ⋮ | ⋮ | ⋮ | ⋮ | ⋮ | ⋮ | ⋮ | ⋮ | ⋮ |
| 6144 | 51 | 20 | 11 | 3 | 19 | 15 | 34 | 1 |

[A]

[B]

[C]

|  | 1 | 2 | 3 | 4 | 5 |  | 96 |
|---|---|---|---|---|---|---|---|
| Pair 1~96 | Pair 11 1 | Pair 5 0 | Pair 31 1 | Pair 9 1 | 0 | ------------- | 1 |
| Pair 97~192 | Pair 99 1 | Pair 126 0 | Pair 150 1 | Pair 153 1 | 0 | ------------- | 1 |
| Pair 193~288 | 1 | 0 | 1 | 1 | 0 | ------------- | 1 |
| Pair 289~384 | 1 | 0 | 1 | 1 | 0 | ------------- | 1 |
| ⋮ | ⋮ | ⋮ | ⋮ | ⋮ | ⋮ |  | ⋮ |
| Pair 6049~6144 | 1 | 0 | 1 | 1 | 0 | ------------- | 1 |
| Extraction results | 1 | 0 | 1 | 1 | 0 | ------------- | 1 |

64 repetitions

Fig. 18

| | Bit number of detected embedded data | | | | | | |
|---|---|---|---|---|---|---|---|
| | 1 | 2 | 3 | 4 | 5 | | 96 |
| Pair 1~96 | Pair 11 1 | Pair 5 ● | Pair 31 1 | Pair 9 1 | ● | — — — — — — — . | 1 |
| Pair 97~192 | Pair 99 1 | Pair 126 ● | Pair 150 1 | Pair 153 1 | ● | — — — — — — — . | Pair 185 ● |
| Pair 193~288 | 1 | ● | 1 | Pair 255 ● | ● | — — — — — — — . | Pair 254 ● |
| Pair 289~384 | 1 | Pair 315 1 | 1 | 1 | Pair 316 1 | — — — — — — — . | 1 |
| Pair 385~480 | Pair 399 ● | ● | 1 | 1 | ● | — — — — — — — . | 1 |
| Pair 481~576 | 1 | ● | 1 | 1 | Pair 520 1 | — — — — — — — . | 1 |
| ⋮ | ⋮ | ⋮ | ⋮ | ⋮ | ⋮ | | ⋮ |
| Extraction results | 1 | ● | 1 | 1 | ● | — — — — — — — . | 1 |

Non – matching

S12

CONTENT DATA JUDGING APPARATUS

FIELD OF THE INVENTION

The present invention relates to an apparatus and a method for judging content data by embedding an electronic watermark in data such as image data or audio data prepared by a digital device, and subsequently detecting the embedded electronic watermark. In particular, the present invention pertains to a content data judging apparatus and a method for maintaining security, by performing an appropriate authentication process, involving the use of a digital device, a recording medium and a plurality of programs, and by inspecting content data for alterations and identifying portions containing altered data. The present invention also pertains to an insurance service processing system using the apparatus and the method.

BACKGROUND OF THE INVENTION

A conventional, well known method for detecting the alteration of image data uses a hash function to prepare in advance information that is added to image data. This information is compared with a hash value produced based on the image data to determine whether the image data were altered. But while the alteration of image data can be detected using this method, a data portion containing altered image data can not be identified. To resolve this problem, the invention in Japanese Patent Application No. Hei 11-158358 was submitted. In this invention, a method is described whereby additional information for detecting an alteration is embedded in content data as an electronic watermark, and the content data portion containing altered data is identified by detecting the additional information.

However, this method does not provide a system for judging content data. A judging operation comprises functions for accurately determining whether an exchange of content data occurred from the time the data were produced until an alteration of the data was detected, for identifying an occasion on which the content data may be altered, and for identifying a portion of the data that was altered.

In addition, the conventional method does not provide a system for maintaining security in order to handle, as evidence, content data prepared by a digital device, such as a camera, a recording device, a scanner or a video camera, or a process for a claim service and an insurance service that uses the data.

Furthermore, the conventional method does not provide a mechanism for determining whether identification data were altered, and for, if the data were altered, identifying a portion containing altered data.

Further, the conventional method does not provide a standardized content data judging method and apparatus, regardless of the digital device type that prepares content data.

To resolve the above problems, it is one object of the present invention to provide a content data judging apparatus and method for accurately determining whether an exchange of content data occurred from the time the data were produced until an alteration of the data was detected, for identifying an occasion on which the content data may be altered, and for identifying a portion of the data that was altered.

It is another object of the present invention to provide a method and a system for maintaining security for accurately determining whether an exchange of content data, or a process for a claim service and an insurance service which uses these content data.

It is an additional object of the present invention to provide a method and a system for determining whether identification data was altered and for identifying a portion of data that was altered.

DESCRIPTION OF THE INVENTION

Content Data Judging Apparatus

A content data judging apparatus, which determines whether content data prepared by a digital device were altered, comprises: (1) means for performing an authentication process using a medium on which content data are recorded; (2) means for reading the content data from the medium; (3) means for embedding, in the content data, data for verifying the pertinent contents; (4) means for extracting, from the content data, the data for verifying the pertinent contents; and (5) means for using the results of the extraction to determine whether the content data were altered. Preferably, the means (5) includes means for, when the content data were altered, identifying a portion containing altered data.

Preferably, the content data recorded in the medium includes the results of an authentication process performed for the digital device and the medium, and the means (2) for reading the content data includes means for reading the results of the authentication process.

Preferably, the means (3) for embedding data for verifying the content data includes means for embedding, in the content data, authentication history information for content data and ID information, such as a creation date, a creator, a creating device and a registration date.

Apparatus for Embedding Data Used for Alteration Detection

An apparatus, for embedding alteration detection data in content data prepared by a digital device, comprises: (1) means for performing an authentication process using a medium on which content data are recorded; (2) means for reading content data stored on the medium; and (3) means for embedding, in the content data, alteration detection data used to identify a portion containing altered data and for storing the resultant content data.

Content Data Alteration Judging Apparatus

A content data alteration judging apparatus comprises: (1) means for extracting alteration detection data from content data; and (2) means for using the results of an extraction of the alteration detection data to determine whether the content data were altered, and for, when the content data were altered, identifying a portion containing altered data.

Image Data Judging Apparatus

An image data judging apparatus, which includes a digital camera, a recording medium on which an image acquired by a digital camera is recorded, an electronic watermark embedding device for accessing and reading image data stored on the recording medium and for embedding an electronic watermark in the image data, and an electronic watermark extraction device for extracting the electronic watermark from the image data, comprises: (1) means for preparing image data in the digital camera; (2) means for performing an authentication process between the digital camera and the recording medium; (3) means for, when the authentication process is successful, recording the image data on the recording medium; (4) means for performing an authentication process between the recording medium and the electronic watermark embedding device; (5) means for, when the authentication process is successful, using the electronic watermark embedding device to read the image data from the recording medium; (6) means for using an electronic watermark embedding device to embed in the image data, as an electronic watermark, alteration determination data, as well as the results obtained by the several authentication processes and ID information for the image data; (7) means for using the electronic watermark embedding device to record, on a storage device, the image data in which the electronic watermark was embedded; (8) means for using the electronic watermark detection device to read the image data from the storage device and to extract the electronic watermark from the image data; and (9) means for using the electronic watermark detection device to determine whether the image data were altered, and for identifying a portion containing altered image data.

Image Data Judging Method

A method for judging an image acquired by a digital camera comprises the steps of: (1) preparing image data in digital camera; (2) performing an authentication process between the digital camera and a recording medium; (3) recording the image data on the recording medium when the authentication process is successful; (4) performing an authentication process between the recording medium and a device driver; (5) performing, when the authentication process is successful, an authentication process between the device driver and an electronic watermark embedding program; (6) permitting the electronic watermark embedding program to read the image data from the recording medium; (7) permitting the electronic watermark embedding program to embed in the image data, as an electronic watermark, alteration determination data, as well as the results of the several authentications processes and ID information for the image data; (8) permitting the electronic watermark embedding program to record on a storage device the image data in which the electronic watermark was embedded; (9) permitting an electronic watermark detection program to read the image data from the storage device and to extract the electronic watermark from the image data; and (10) permitting the electronic watermark detection program to use the extracted electronic watermark to determine whether the image data were altered, and to identify a portion containing altered image data.

Insurance Service Processing System

An insurance service processing system, which detects the alteration or the substitution of evidence data in order to safely and efficiently perform a service process for the assessment of damages, comprises: (1) means for using a digital device to prepare evidence data for an object; (2) means for embedding alteration detection data in the evidence data and for recording the resultant evidence data on a storage device; (3) means for the extraction of the alteration detection data from the evidence data, for using the results of the extraction to determine whether the evidence data were altered, and for, when the evidence data were altered, identifying a portion containing altered data and judging the evidence data recorded on the storage device.

Insurance Service Processing Method

An insurance service processing method, for detecting the alteration or the substitution of evidence data in order to safely and efficiently perform a service process for the assessment of damages, comprises the steps of: (1) using a digital device to prepare evidence data for a damaged object; (2) embedding alteration detection data in the evidence data, and recording the resultant evidence data on a storage device; (3) performing an extraction of the alteration detection data from the evidence data, using the results of the extraction to determine whether the evidence data were altered, and, when the evidence data were altered, identifying a portion containing altered data and judging the evidence data recorded on the storage device.

Smart Card

A smart card used for identifying an owner comprises: (1) a card face on which the name of the owner or a card number is written; and (2) a storage device on which is recorded, for the owner, evidence data in which alteration detection data was embedded to identify a portion containing altered data.

Evidence Data Detection Apparatus

An evidence data detection apparatus, which includes a smart card reader for reading data from a smart card, comprises: (1) means for reading, from the smart card, evidence data for an owner in which alteration detection data were embedded; and (2) means for using the results of an extraction of the alteration detection data to determine whether the alteration detection data were altered, and for, if the alteration detection data were altered, identifying a portion containing altered data.

Medium Including a Program for Embedding Alteration Detection Data

A medium is provided which includes a program for embedding alteration detection data in content data prepared by a digital device, the program permitting a computer to perform: (1) a function for performing an authentication process for a recording medium on which content data are recorded; (2) a function for reading the content data from the recording medium; and (3) a function for embedding, in the content data, alteration detection data for identifying a portion containing altered data, and for recording the resultant content data on a storage device.

Medium Including a Program for Determining Whether Content Data Were Altered

A medium is provided which includes a program for determining whether content data were altered, the program permitting a computer to perform: (1) a function for extracting alteration detection data from content data; and (2) a function for using the results of an extraction to determine whether the content data were altered, and for, when the content data were altered, identifying a portion containing altered data.

Preferably, the digital device is a camera, a recording device, a scanner or a video camera. In the following description of an alteration determination apparatus, a detailed explanation will be given for the means for embedding alteration detection data in the content data, the means for extracting the alteration detection data from the content data, and the means for using the results of an extraction to determine whether the content data were altered; and for, when the content data were altered, identifying a portion containing altered content data.

Alteration Determination Apparatus

According to the present invention, a content alteration determination apparatus comprises: alteration detection data embedding means (hereinafter referred to as a data addition device) for adding predetermined embedded data to content data; and a determination device for determining whether the content data were altered. The data addition device includes: content data division means for dividing at least one part of the content data to obtain first blocks; and embedded data addition means for adding predetermined first embedded data to each of the first blocks to obtain second blocks. The determination device includes data extraction means (alteration detection data extraction means) for extracting the embedded data (second embedded data) added to at least one part of each second block, and alteration determination means (altered portion identifying means) for using the extracted second embedded data to determine whether at least one part of each second block was altered.

Preferably, an alteration determination apparatus includes a data addition device for adding to image data predetermined embedded data and a determination device for determining whether the image data were altered. The data addition device includes image division means for dividing image data to obtain first image blocks, and embedded data addition means for adding predetermined first embedded data to each of the first image blocks to obtain second blocks. The determination device includes embedded data extraction means for extracting embedded data (second embedded data) added to each of the second image blocks, and alteration determination means for using the second embedded data to determine whether each of the second image blocks was altered.

Preferably, the image division means divides the image data to obtain first image blocks, each of which includes a number of data units. The embedded data addition means makes an adjustment so that the first embedded data are represented, in accordance with a predetermined rule, by the relationship of the corresponding data unit values that are included in the two or more first image blocks that correspond to each other, and adds the first embedded data to each of the first image blocks to obtain the second image blocks.

Preferably, when one of the second image blocks is altered, the embedded data addition means makes an adjustment so that the data unit values that are included in the pertinent second image blocks and that correspond to each other do not follow the predetermined rule.

Preferably, the embedded data extraction means extracts, from each of the second image blocks, the second embedded data that is represented, in accordance with the predetermined rule, by the relationship of the data unit values included in the individual second image blocks.

Preferably, the alteration determination means uses the results of a comparison of the first embedded data with the extracted second embedded data to determine whether any of the second image blocks were altered.

Preferably, the first and the second image blocks are conversion blocks, each of which includes data units and at least one pair of conversion coefficients obtained by dividing image data to obtain predetermined process blocks, and by transforming the blocks from spatial areas to frequency areas.

Preferably, the first and the second image blocks are DCT blocks, each of which includes data units and one pair of DCT coefficients obtained by dividing image data into predetermined DCT blocks and by performing a discrete cosine transformation (DCT) for the blocks.

Processing by Alteration Determination Apparatus

According to the present invention, the alteration determination apparatus first divides content data into a plurality of portions.

The content data can be, for example, image data for audio data or for damaged vehicles and objects at a traffic accident. If such content data are altered intentionally, they can not be used as evidence data.

Next, the alteration determination apparatus embeds data (a so-called electronic watermark (digital watermark)) in each portion of the resultant content data. The embedded data are used to determine whether an alteration has occurred, and are embedded using a predetermined method whereby the embedding of data in another portion is not affected, and whereby the detection of an alteration has no affect on another portion. That is, a closed form is used for embedding data in each of the portions of the content data. Finally, the alteration detection apparatus performs a closed process to detect data in the portions of the data contents, and determines whether the data were altered.

Specific Examples Used in the Following Explanation

Any method for embedding an electronic watermark (embedded data) in divided image data portions may be used, just so long as the alteration determination apparatus of this invention can embed an electronic watermark having a closed form in each separate portion of image data.

As a specific example for the explanation, the alteration determination apparatus of the invention divides image data encoded using the JPEG method into a plurality of sets (image blocks), each of which includes a plurality of DCT coefficients; embeds an electronic watermark in each set in order to determine whether an alteration has occurred; and for each set determines whether image data were altered.

The alteration determination apparatus of the invention may embed data (an electronic watermark) in one part of image data to detect an alteration, or may not match a data embedded area with an alteration detection area. In the following explanation, as another specific example, the alteration determination apparatus embeds data in all of the image data and determines whether an alteration has occurred.

As an additional example, the DCT coefficients used by the alteration determination apparatus to embed data (an electronic watermark) are obtained, for example, by forming luminous elements (Y) of color image data into a plurality of 8×8 pixel DCT blocks (macro blocks), and by performing a DCT process for the DCT blocks.

As a further example, a method used to select a set including a plurality of DCT coefficient pairs is, for example, a method used to select a set of DCT coefficients by using a random number, or a method used to select as a set adjacent DCT coefficients. Hereinafter, DCT coefficient pairs are obtained using the second method, i.e., a DCT coefficient set is an adjacent DCT coefficient pair that is obtained by a DCT transformation of two adjacent DCT blocks.

Processing Using a Data Addition Device

In the alteration determination apparatus of the invention, the data addition device embeds data (an electronic watermark) in image data in order to determine, for each pair of DCT coefficients, whether an alteration has occurred.

Image Division Means

In the data addition device, the image division means performs Huffmann decoding of image data compressed using the JPEG method. Then, of three image data elements obtained as a result, the image division means accepts a DCT coefficient of the luminance element (Y), and correlates it with an adjacent DCT coefficient to form a pair (first image block) of the adjacent correlated DCT coefficients.

Embedded Data Addition Means

The embedded data addition means extracts at least one (one data unit) of the two DCT coefficients included in each pair (first image block) in correlation with each other (since at least one of the two DCT coefficients is extracted, a plurality of data units are selected from one pair).

Further, the embedded data addition means uses key information to generate a random number, and uses the random number to perform a scramble process for 96 bits of embedded data.

The embedded data addition means correlates the pair (first image block) with each bit of the scrambled embedded data (first embedded data).

The embedded data addition means extracts one of the two DCT coefficients in a pair (first image block). To embed data, the embedded data addition means adjusts the DCT coefficient values (data unit values) correlated with each other, so that the relationship of these DCT coefficients represents the value (1 or 0) of the data bit (first embedded data) that corresponds to the pair (first image block) that includes the DCT coefficients in accordance with the predetermined rule.

The method used for selecting DCT coefficients from the two DCT coefficients included in a pair (first image block) may be a method for the selection of DCT coefficients in accordance with a fixed correlation, or a method for the selection of DCT correlated coefficients based on a random number.

As a specific example, for each pair (a first image block) in the following explanation, a random number is used to select three corresponding DCT coefficients (a total of six) from two DCT blocks in a pair, i.e., when a pair differs, DCT coefficients are selected from different locations, while when the same pair is used, DCT coefficients are selected at the same location.

When data bits are embedded in each pair, the alteration of a specific pair does not affect the other pair, unlike when data are embedded using a hash function. That is, when data are embedded in the above described manner, the alteration of one image data portion does not affect the other image data portions, and thus, whether image data was altered can be determined for each portion.

Processing Performed by Determination Device

When bites of data (first embedded data) are embedded, and when image data are altered by pasting in one part of image data and by erasing a photo image, the relationship of DCT coefficients (data units) that are included in a pair (second image block) in the altered portion and correlate with each other does not follow the above predetermined rule. Thus, the bit value of the embedded data (second embedded data) differs from the bit value of the first embedded data.

When the first 96 bits of embedded data, for example, are embedded in 6144 pairs (first image block) of DCT coefficients that constitute an image of 1024×768 bits, each bit of the first embedded data is embedded in 64 sets of image data.

When only a comparatively small portion of image data is altered, the number of pairs for the altered portion that do not represent the bits of corresponding embedded data (the first embedded data) should be smaller than the number of pairs that represent the bits of the corresponding embedded data (the first embedded data).

Therefore, when the second embedded data are extracted from an image that may be altered, and a majority bit decision is used to decide, in accordance with the predetermined rule, whether the value represented by each pair of the 64 extracted data pairs (the second image blocks), which correspond to the same bit in the first embedded data, is a 1 or is a 0, the value represented by the majority of pairs is determined to be the value of the embedded data (the first embedded data) added by the data addition device.

Similarly, as a result of the majority bit decision, it can be assumed that at the locations of the minority of the pairs (the second image blocks) altered data were added.

A property of embedded data is used by the determination device of the present invention. That is, the determination device extracts, from DCT coefficient pairs (second embedded data) that may be altered, data (second embedded data) that may, as the result of an alteration, have values that differ from their original values.

In addition, the determination device uses the extraction results to determine which DCT coefficient pair (second image block) was altered, i.e., what portion of image data was altered.

Embedded Data Extraction Means

In accordance with the predetermined rule, the embedded data extraction means extracts a value (second embedded data), represented by corresponding DCT coefficients (data units), that is included in two DCT coefficients in a pair (a second image block) that may be altered after the first embedded data were added by the data addition device.

Alteration Determination Means

The alteration determination means uses the majority bit decision to decide whether the value represented by the majority of pairs (second image blocks) corresponding to the same bit of the embedded data is a 1 or is a 0, and determines that pairs having that majority value are first embedded data. Furthermore, the alteration determination means determines that a pair (a second image block) that represents a value different from that of the first embedded data was altered.

Data Addition Device

The data addition device of the present invention adds predetermined embedded data to image data in order to determine whether the image data were altered. For this determination, the second embedded data, which are added to a plurality of second image blocks included in the image data, are used to determine whether each of the second image blocks was altered. The data addition device includes image division means for dividing image data to obtain a plurality of first image blocks, and embedded data addition means for adding predetermined first embedded data to each of the thus obtained first image blocks to form a plurality of second image blocks.

Determination Device

The determination device of the present invention divides image data to obtain a plurality of first image blocks, and adds predetermined first embedded data to each of the thus obtained first image blocks to form a plurality of second image blocks. The determination device then ascertains whether each of the second image blocks was altered. Included in the determination device are embedded data extraction means, for extracting second embedded data that were added to each of the second image blocks, and alteration determination means, for using the extracted second embedded data to determine whether each of the second image blocks was altered.

Alteration Determination Method

According to the alteration determination method of the present invention, predetermined embedded data are added to object content data, and whether the resultant content data were altered is determined. The alteration determination method comprises the steps of: dividing the content data to obtain a plurality of first blocks; adding predetermined first embedded data to the individual first blocks to form a plurality of second blocks; extracting the second embedded data from the second blocks; and using the second embedded data to determine whether each of the second blocks was altered.

Recording Medium

A first recording medium according to the present invention is provided for an alteration determination apparatus that includes a data addition device, for adding predetermined embedded data to image data, and a determination device, for determining whether such image data are altered. The first recording medium is used to record a program that permits a computer to perform: an image division step of dividing image data to obtain a plurality of first image blocks; an embedded data addition step of adding predetermined first embedded data to the individual first image blocks to form a plurality of second image blocks; an embedded data extraction step of extracting the embedded data (second embedded data) from each of the second image blocks; and an alteration determination step of using the obtained second embedded data to determine whether each of the second image blocks was altered.

According to the present invention, a second recording medium is provided for a data addition device that adds predetermined embedded data to image data in order to determine whether the image data were altered. For this determination, the second embedded data which are added to each of the second image blocks included in the image data, are used to determine whether the second image blocks were altered. The second recording medium is used to record a program that permits a computer to perform: an image division step for dividing image data to obtain a plurality of first image blocks; and an embedded data addition step for adding predetermined first embedded data to the individual first image blocks to form a plurality of second image blocks.

According to the present invention, a third recording medium is provided for a determination device that divides image data to obtain a plurality of first image blocks, that adds predetermined first embedded data to the individual first image blocks to form a plurality of second image blocks, and that determines whether each of the second image blocks was altered. The third recording medium is used to record a program that permits a computer to perform: an embedded data extraction step of extracting embedded data (second embedded data) from the second image blocks; and an alteration determination step of using the extracted second embedded data to determine whether each of the second image blocks was altered.

BRIEF DESCRIPTION OF THE DRAWINGS

FIGS. 10A and 10B are diagrams for a case where the values of DCT coefficients for blocks 1 and 2, selected in FIG. 8, need not be changed in order to embed a data bit (value 1) in pair i.

FIG. 18 is a diagram showing a table indicating the value of a bit that the extraction section extracts from each pair included in JPEG data, which are generated by the embedding section (FIGS. 2 and 3) and to which no alteration or error was added.

PREFERRED EMBODIMENT

The preferred embodiment of the present invention will now be described.

Alteration Determination Apparatus 1

Figure 1:
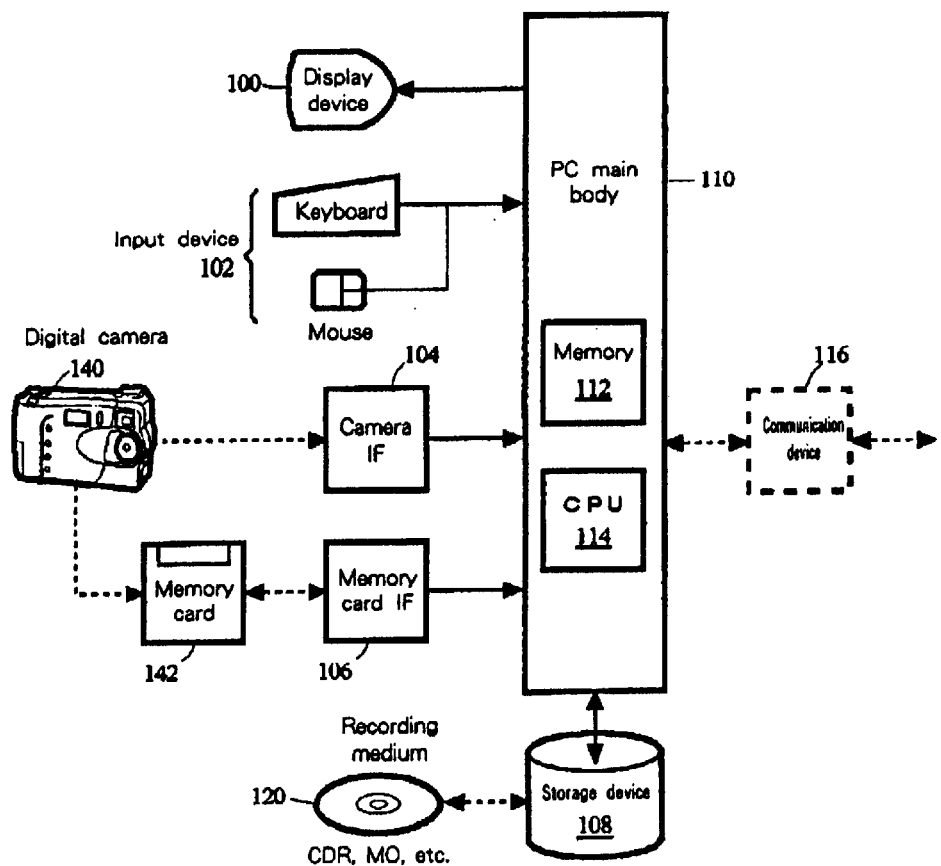
FIG. 1 is a diagram illustrating the arrangement of an image alteration determination apparatus for carrying out an alteration determination method according to the present invention.

FIG. 1 is a diagram illustrating the arrangement of an image alteration determination apparatus 1 for the employment of an alteration determination method according to the present invention.

As is shown in FIG. 1, the image alteration determination apparatus 1 comprises: a display device 100, such as a CRT display device or a liquid crystal display device; an input device 102, including a keyboard and a mouse; a digital camera interface (camera IF) 104; a memory card interface (memory card IF) 106; a storage device 108, such as an MO drive or a CD drive; and a computer main body (PC main body) 110, including a memory 112 and a microprocessor (CPU) 114. A communication device 116 is additionally provided as needed.

That is, the image alteration determination apparatus 1 is a common computer for which the camera IF 104 and the memory card IF 106 are additionally provided.

With this arrangement, the image alteration determination apparatus 1 loads, into the memory 112, an embedding/judging program 2 (see FIG. 2) that is supplied to the storage device 108 from a recording medium 120, such as a magneto-optical disk (MO) or a compact disk (CD). Then, the image alteration determination apparatus 1 executes the program 2 to embed an electronic watermark (embedded data) in image data and to determine whether an image data alteration has occurred (regardless of whether the alteration was intentional or due to an accident, such as unintentional data damage).

Specifically, when an image obtained by the digital camera 140 is coded and compressed using, for example, the JPEG method to generate compressed image data, the image alteration determination apparatus 1 receives the compressed image data through the camera IF 104. Or, when the digital camera 140 records the compressed image data on the memory card 142, the image alteration determination apparatus 1 receives the compressed image data via the memory IF 106.

The image alteration determination apparatus 1 embeds an electronic watermark (embedded data) in the received compressed image data, and uses the embedded electronic watermark to identify a portion of the image data that was altered.

Embedding/Judging Program 2

Figure 2:
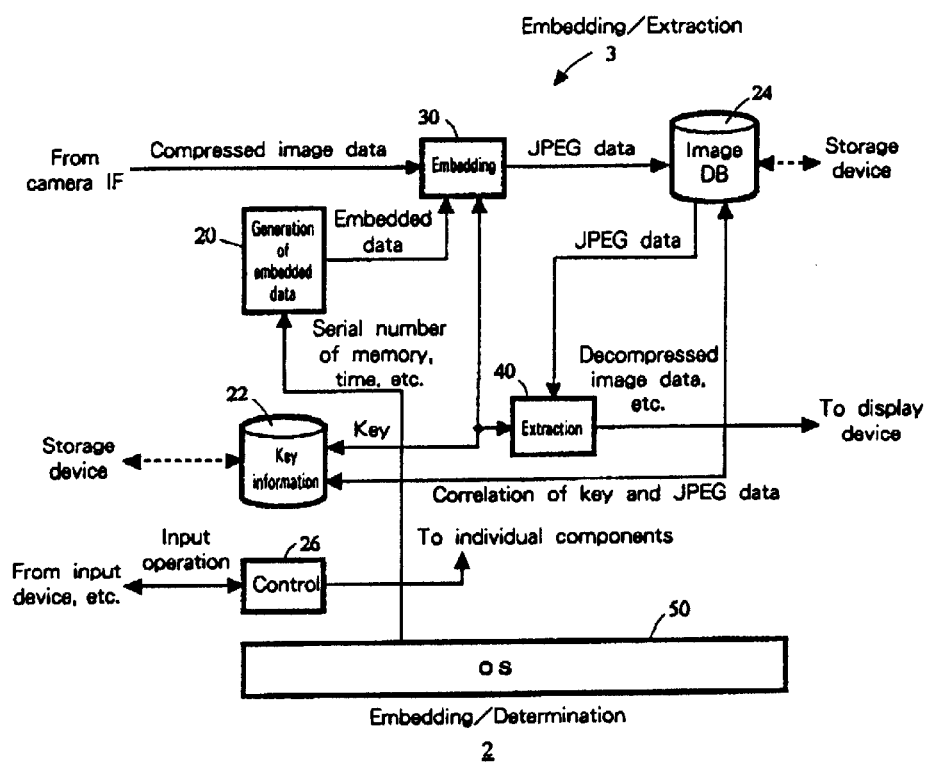
FIG. 2 is a diagram illustrating the configuration of an embedding/determination program, which is executed by the image alteration determination apparatus in FIG. 1, to carry out the alteration determination method of the present invention.

FIG. 2 is a diagram showing the structure of the embedding/judging program 2 executed by the image alteration determination apparatus in FIG. 1 to use the alteration determination method of the present invention.

As is shown in FIG. 2, the embedding/judging program 2 is constituted by an embedding/extraction section 3, a key information database (DB) 22, and an image database (DB) 24. The embedding/extraction section 3 includes an embedded data generator 20, a controller 26, an embedding section 30, an extraction section 40, and an OS 50.

OS 50

The OS 50 is operating system software, such as Windows (a trademark of Microsoft Corp.), and controls the components of the embedding/judging program 2.

The OS 50 supplies necessary data to each component of the embedding/judging program 2. For example, it supplies data, such as the serial number of the memory card 142 and the time, to the embedded data generator 20 for the generation of an electronic watermark.

Controller 26

The controller 26 displays a GUI image (not shown) on the display device 100, accepts data entered by a user for the manipulation of the displayed GUI image, and as needed, transmits the received operating data to the components of the embedding/judging program 2.

The controller 26 controls the components of the embedding/judging program 2 in accordance with instructions received from the user.

Image DB 24

When the embedding section 30 embeds data in compressed image data (JPEG data), using the image DB 24 the resultant compressed image data are stored and managed on the recording medium 120 that is inserted into the storage device 18, or on the memory card 142 that is inserted into the memory card IF 106. These image data are read and output through the image DB 24 to the extraction section 40.

Key Information DB 22

The key information DB 22 is used to store and manage, in the storage device 108, key information with which the JPEG data managed using the image DB 24 is correlated with a key value (e.g., a 64-bit numerical value). The key value is used to generate a random number when the embedding section 30 embeds the data in the JPEG data. The key information is read and output via the key information DG 22 to the embedding section 30 and the extraction section 40.

Embedded Data Generator 20

The embedded data generator 20 generates 96 bits of embedded data from data, such as the serial number of a memory, received from the OS 50, and outputs the embedded data to the embedding section 30.

Embedding Section 30

Figure 3:
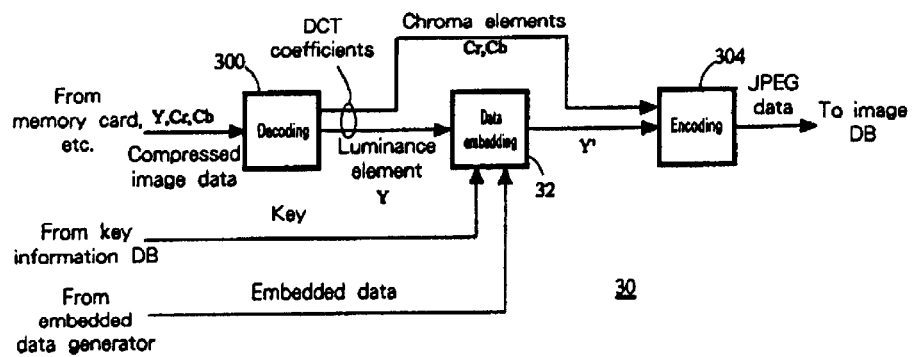
FIG. 3 is a diagram illustrating the arrangement of an embedding section 30 in FIG. 2.

FIG. 3 is a diagram showing the structure of the embedding section 30 in FIG. 2.

Figure 4:
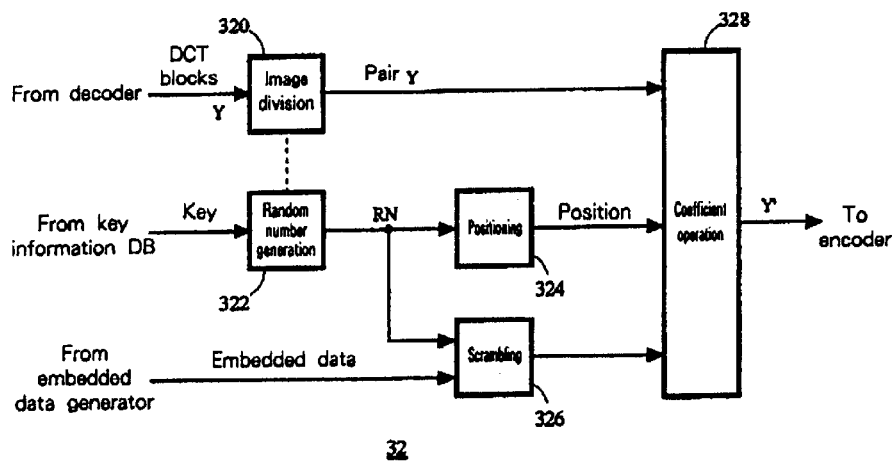
FIG. 4 is a diagram illustrating the arrangement of a data embedding portion 32 in FIG. 3.
Figure 6:
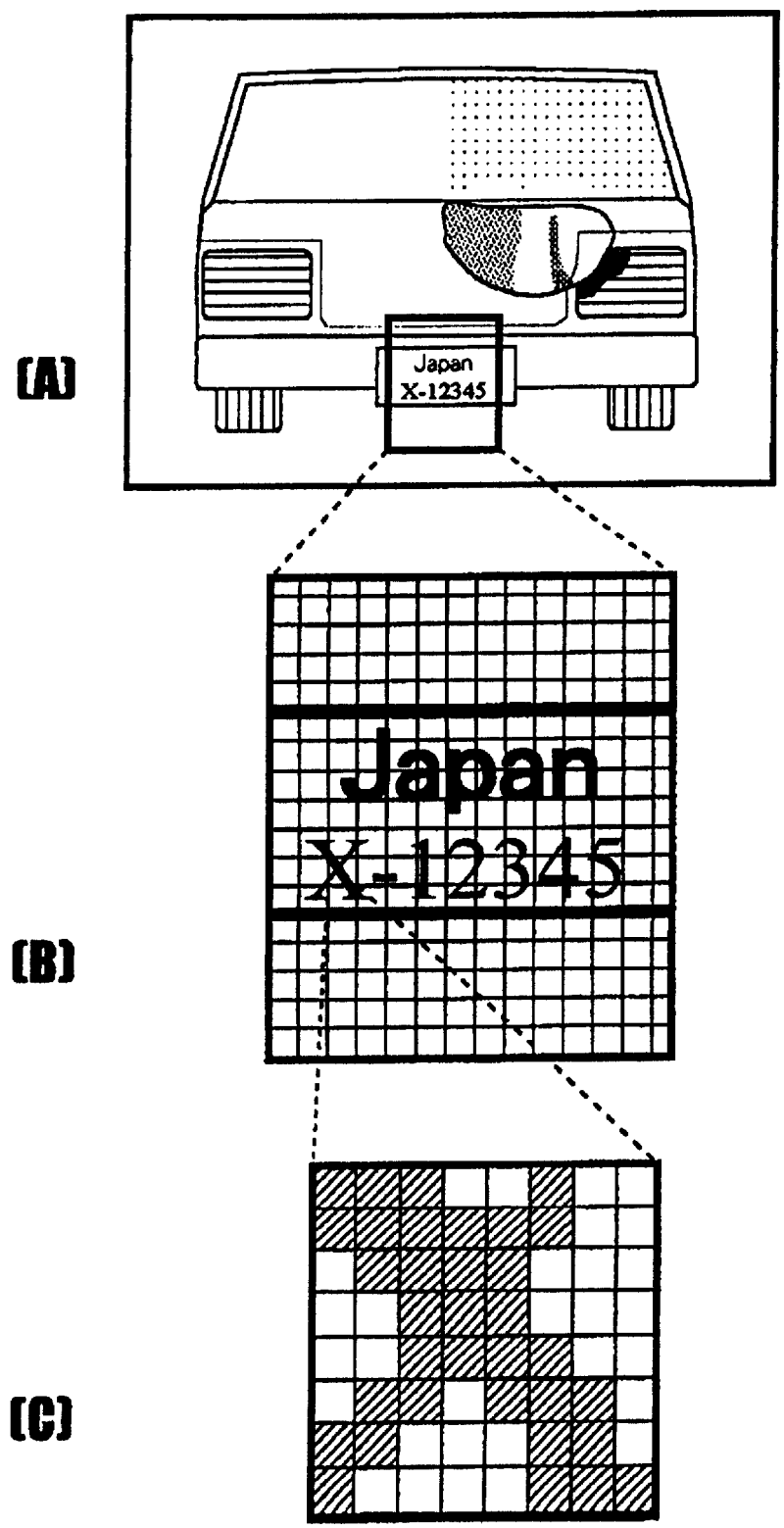
FIG. 6A is a diagram showing one part of the non-compressed image data in FIG. 5.
FIG. 6B is a diagram showing DCT blocks (macro blocks) included in the partial non-compressed image data in Fig.
FIG. 6C is a diagram showing 8×8 pixels included in each DCT block in FIG. 6B.
Figure 7:
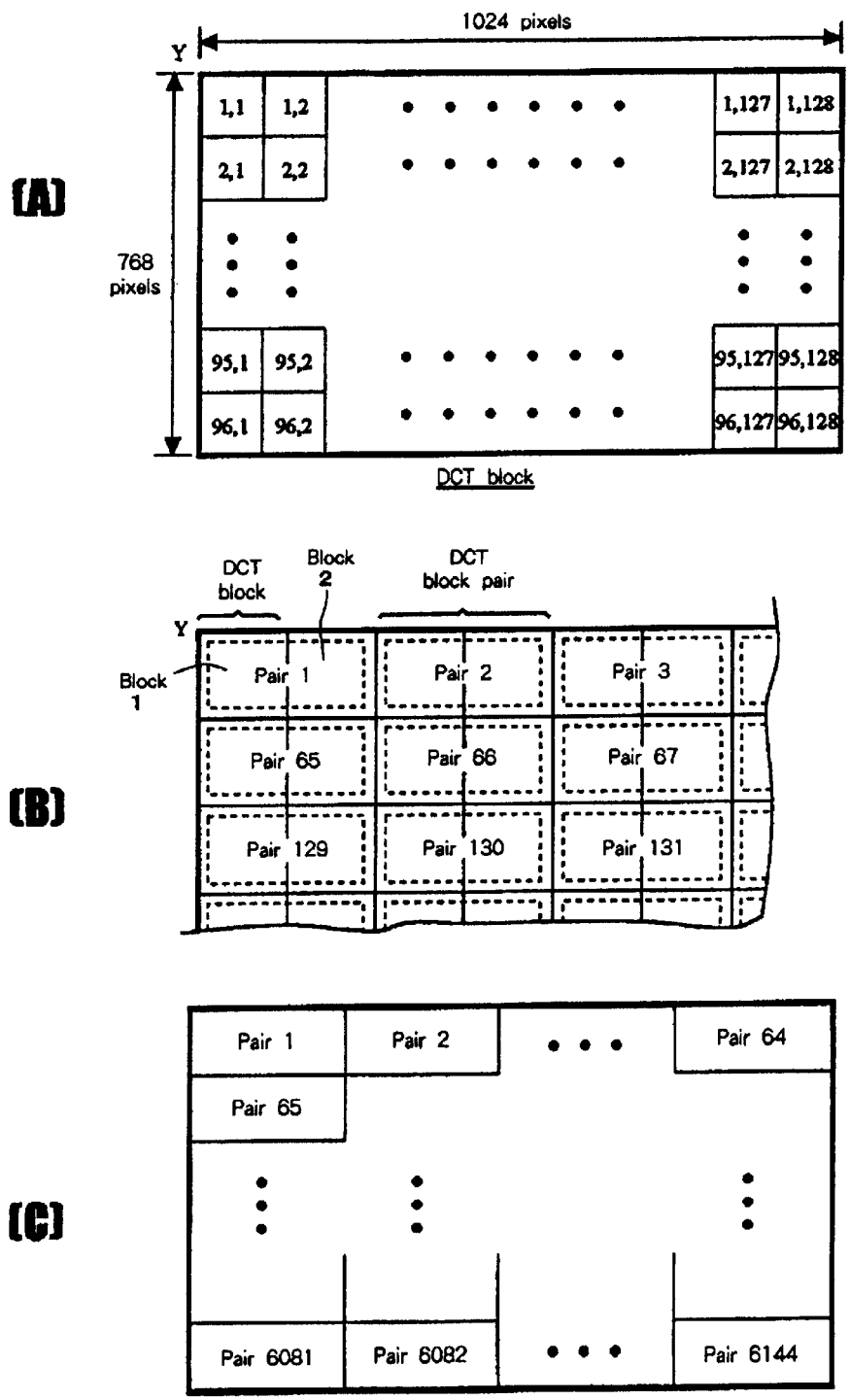
FIG. 7A is a diagram showing DCT coefficients for luminance signal Y, which a decoder obtains by performing Huffmann decoding for compressed image data received from the digital camera.
FIG. 7B is a diagram showing a method for correlating adjacent DCT coefficient pairs, selected from among those for luminance signal Y in FIG. 7A.
FIG. 7C is a diagram showing pairs of DCT coefficients correlated using the method shown in FIG. 7B.

FIG. 4 is a diagram showing the structure of a data embedding portion 32 in FIG. 3.

As is shown in FIGS. 3 and 4, the embedding section 30 includes a decoder 300, the data embedding portion 32, and an encoder 304. The data embedding portion 32 includes an image divider 320, a random number generator 322, a positioning portion 324, a scramble portion 326, and a coefficient operator 328.

Outline of Embedding Section 30

By using the above described components, from the 8×8 pixel DCT coefficients for each set (64 pixels in each set) of chroma elements Cb and Cr and luminance element Y that constitute the compressed color image data, the embedding section 30 forms, for example, luminance element Y into a plurality of pairs (first image blocks), each of which include two DCT coefficients.

The 96 bits of data generated by the embedded data generator are scrambled based on a random number produced, for example, by the 16-bit linear congruence method (hereinafter, to simplify the explanation, the scrambled data are referred to as the first embedded data, or simply as embedded data). The embedding section 30 uses the key information received from the key information DB 22 (FIG. 2) to embed, in each of the pairs, a bit of the scrambled data.

Details of Embedding Section 30

The processing by the embedding section 30 will be described in detail while referring to FIGS. 5 to 12.

Figure 5:
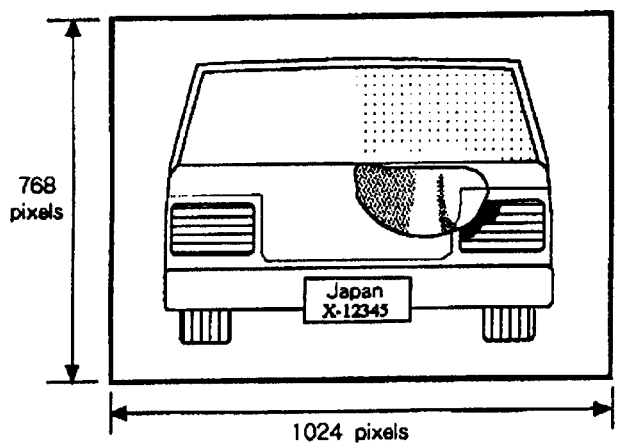
FIG. 5 is a diagram showing example non-compressed image data acquired by a digital camera (FIG. 1).

FIG. 5 is a diagram showing example non-compressed image data obtained with the digital camera 140 (FIG. 1).

FIG. 6A is a diagram showing one portion of the non-compressed image data in FIG. 5; FIG. 6B is a diagram showing DCT blocks (macro blocks) included in one portion of the non-compressed image data in FIG. 6A; and FIG. 6C is a diagram showing 8×8 pixels included in each of the DCT blocks in FIG. 6B.

The DCT blocks must be distinguished from the 8×8 DCT coefficients. However, to simplify the explanation, hereinafter an 8×8 DCT coefficient is also described as a DCT block, and the individual DCT coefficients included in an 8×8 DCT block are described as DCT coefficients.

The digital camera 140 (FIG. 1) obtains a photo of, for example, a person and scenery, generates non-compressed color image data in FIG. 5, and compresses and encodes the image data using the JPEG method.

Specifically, as is shown in FIGS. 6A to 6C, the digital camera 140 divides the luminance element Y and the chroma elements Cr and Cb that are included in the obtained non-compressed image data to form DCT blocks (macro blocks), in each of which are 8×8 (64) pixels. The digital camera 140 then performs a DCT transformation for the obtained DCT blocks, and uses Huffmann coding for the results to generate JPEG compressed image data. The JPEG compressed image data are transmitted via the camera IF 104, or via the memory card 142 and the memory card IF 106, to the embedding section 30 (FIG. 2 or 3) of the embedding/judging program 2 executed by the PC main body 110 (FIG. 1).

FIG. 7A is a diagram showing the DCT coefficient of the luminance signal Y obtained when the decoder 300 performs Huffmann decoding for the compressed image data received from the digital camera 140. FIG. 7B is a diagram showing a method for correlating adjacent DCT coefficients located among those for the luminance signal Y in FIG. 7A. FIG. 7C is a diagram showing pairs of DCT coefficients correlated with each other using the method in FIG. 7B.

First, the embedding section 30 performs Huffmann decoding for the received JPEG compressed image data to obtain DCT blocks for the luminance element Y and the chroma elements Cr and Cb. From among these DCT blocks, 12288 DCT blocks (1,1 to 96,128) for the luminance element Y in FIG. 7A are formed into 6144 (12288/2) pairs of adjacent blocks (blocks 1 and 2), as is shown in FIGS. 7B and 7C.

Then, the embedding section 30 non-repetitively correlates each bit of the 96-bit data scrambled using the random number with 64 of the 6144 (96×64) pairs.

Figure 8:
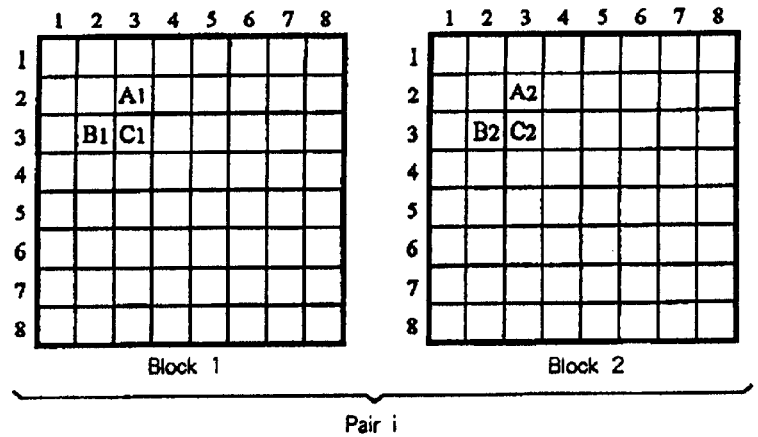
FIG. 8 is a diagram showing mutually corresponding DCT coefficients that the embedding section in FIGS. 2 and 3 selects from DCT blocks (blocks 1 and 2) included in one pair (FIGS. 7A and 7B).

FIG. 8 is a diagram showing corresponding DCT coefficients that the embedding section 30 in FIG. 2 or 3 selects from the individual DCT blocks (blocks 1 and 2) in one pair (FIGS. 7A and 7B).

Selected in the example in FIG. 8 are three DCT coefficients, (2, 3), (3, 2) and (3, 3), that occupy corresponding locations in two DCT blocks (blocks 1 and 2) included in pair i ($1 \leq i \leq 6144$)

The embedding section 30 uses a random number generated using a key received from the key information DB (FIG. 2), and selects, at random for each pair, three mutually corresponding DCT coefficients (data units $A_1$, $A_2$, $B_1$, $B_2$, $C_1$ and $C_2$) in the DCT blocks (blocks 1 and 2), as is shown in FIG. 8. That is, to embed bits, the embedding section 30 selects adjacently located DCT coefficients occupying like positions in the DCT blocks (blocks 1 an 2) included in a specific pair, but selects DCT coefficients occupying different positions in the DCT blocks of a different pair.

FIGS. 9A and 9B are diagrams showing an example where the numerical values of the DCT coefficients selected in FIG. 8 for blocks 1 and 2 must be changed in order to embed data bits (values of 1).

Figures 10, 11:
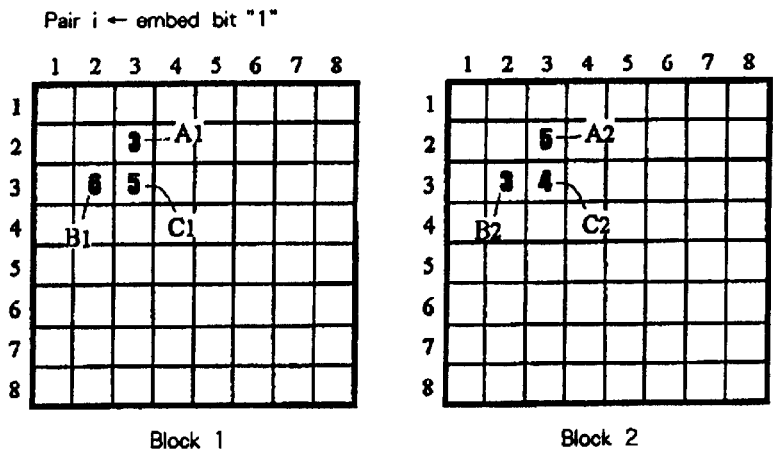
FIG. 11 is a diagram showing an embedding table used when the embedding section 30 (FIGS. 2 and 3) embeds data in the DCT blocks.

FIG. 10 is a diagram showing an example where the numerical values of the DCT coefficients selected in FIG. 8 for blocks 1 and 2 need not be changed to embed data bits (values of 1).

The embedding section 30 adjusts the relationship of the values of the DCT coefficients ($A_1$, $A_2$, $B_1$, $B_2$, $C_1$ and $C_2$) selected from the two DCT blocks in pair i in FIG. 8, so that the relationship corresponds to the rules in table 1 (rules 1-1 and 1-2) and is in accordance with the bit values of the data that correspond to the individual pairs shown in FIGS. 9A, 9B and 10. Then, the embedding section 30 embeds in each pair the bit value (1 or 0) of the corresponding data.

TABLE 1

Table 1: Rules representing the relationship of DCT coefficients:

When the bit value of data corresponding to a pair is 1:
$(A_1 < A_2 \ \&\& \ B_1 < B_2 \ \&\& \ C_1 < C_2)\|$ (rule 1-1)
$(A_1 > A_2 \ \&\& \ B_1 > B_2 \ \&\& \ C_1 < C_2)\|$
$(A_1 < A_2 \ \&\& \ B_1 > B_2 \ \&\& \ C_1 > C_2)\|$
$(A_1 > A_2 \ \&\& \ B_1 < B_2 \ \&\& \ C_1 > C_2$
When the bit value of data corresponding to a pair is 0:
$(A_1 < A_2 \ \&\& \ B_1 < B_2 \ \&\& \ C_1 > C_2)\|$ (rule 1-2)
$(A_1 > A_2 \ \&\& \ B_1 < B_2 \ \&\& \ C_1 < C_2)\|$
$(A_1 < A_2 \ \&\& \ B_1 > B_2 \ \&\& \ C_1 < C_2)\|$
$(A_1 > A_2 \ \&\& \ B_1 > B_2 \ \&\& \ C_1 > C_2$ wherein in the rules 1-1 and 1-2, X&&Y means both conditions X and Y are satisfied, and X|Y means either condition X or Y is satisfied.

Assume that, as is shown in FIG. 9A, the bit value of the data corresponding to pair I is 1, and the values of the mutually corresponding DCT coefficients ($A_1$, $A_2$, $B_1$, $B_2$, $C_1$ and $C_2$) in the two DCT blocks (blocks 1 and 2) of pair I are 4, 4, 2, 3, 4 and 5, 5, respectively. Since the relationship of the values of these DCT coefficients is $A_1=A_2$, the rules 1-1 and 1-2 are not satisfied.

Therefore, as is shown by the numeral enclosed in the circle in FIG. 9B, the embedding section 30 increments the value of $A_2$ and embeds bit 1 of the data, so that the relationship of the values of the mutually corresponding DCT coefficients ($A_1$, $A_2$, $B_1$, $B_2$, $C_1$ and $C_2$) satisfies condition ($A_1<A_2\&\&B_1<B_2\&\&C_1<C_2$) in rule 1-1.

Specifically, if the values of the DCT coefficients ($A_1$, $A_2$, $B_1$, $B_2$, $C_1$ and $C_2$) do not satisfy rule 1-1, the DCT coefficients are adjusted so that the relationship of these DCT coefficients constantly satisfies condition ($A_1<A_2\&\&B_1<B_2\&\&C_1>C_2$) in rule 1-1, and bit of 1 of data is embedded.

Further, assume that, as is shown in FIG. 10, the bit value of the data corresponding to pair i is 1, and the values of the mutually corresponding DCT coefficients ($A_1$, $A_2$, $B_1$, $B_2$, $C_1$ and $C_2$) in the two DCT blocks (blocks 1 and 2) of pair i are 3, 5, 6, 3, 5 and 4, respectively. The relationship of the values of these DCT coefficients satisfies condition ($A_1<A_2\&\&B_1>B_2\&\&C_1>C_2$) in rule 1-1.

Therefore, in this case the embedding section 30 does not change the values of the DCT coefficients ($A_1$, $A_2$, $B_1$, $B_2$, $C_1$ and $C_2$) in the two DCT blocks (blocks 1 and 2) of pair i.

FIG. 11 is a diagram showing a table that the embedding section 30 (FIG. 2 or 3) uses when embedding data in DCT blocks.

In FIG. 11, an embedded data bit number is shown in order to indicate that the embedded data were scrambled. This number not used during the actual processing.

A further explanation will be given, while referring to FIG. 11, for the previously described embedding processing performed by the embedding section 30.

The embedding section 30 correlates two adjacent DCT blocks, each (FIGS. 7A to 7C) composed of 12288 DCT blocks obtained from image data comprising 1024×768 pixels (FIGS. 5 and 6A to 6C), and provides 6144 pairs of DCT blocks.

The embedding section 30 receives 96 bits of data from the embedded data generator 20 (FIG. 2), and scrambles the data using a random number produced with a key received from the key information DB 22. The embedding section 30 uses the following method to unrepetitively correlate each of the bit values (1 and 0) of the scrambled 96-bit data with 64 of the 6144 pairs, and enters the results in the embedded data assignment column in the table in FIG. 11.

Embedded Data Correlation Method

As is shown in FIG. 11, since each bit of the 96-bit data are scrambled in a different order correlates with one of 96 sets of sequential pairs, for example, the seventh bit (1) of the data is assigned to the fifth pair and the 160th pair.

Similarly, 6144 pairs are divided into 0.64 sets×96 pairs, and individual bits of 96-bit data are correlated with the 96 pairs in each set in a different order for each set.

For example, the first to the fourth bits of the 96-bit data are correlated with the eleventh, the fifth, the 31st and the ninth pairs in the first set that includes the first to the 96th pairs, and with the 99th, the 126th and the 153rd pairs in the second set that includes the 97th to 192nd pairs (see FIG. 18).

The embedding section 30 uses the generated random number to determine which DCT coefficients ($A_1$, $A_2$, $B_1$, $B_2$, $C_1$ and $C_2$) are to be extracted from two DCT blocks (blocks 1 and 2) in each pair, as is shown in FIG. 8. The values of the extracted DCT coefficients are written in blocks 1 and 2 of the coefficient columns in the table.

As is described above, the 8×8 DCT coefficients are extracted by embedding section 30 are not constant for every pair.

When the above processing is completed, the embedding section 30 adjusts the values of the DCT coefficients ($A_1$, $A_2$, $B_1$, $B_2$, $C_1$ and $C_2$) entered in the block 1 and 2 columns of the table, so that the DCT coefficients ($A_1$, $A_2$, $B_1$, $B_2$, $C_1$ and $C_2$) selected from the DCT blocks (blocks 1 and 2) for each pair represent the bit values in the embedded data assignment column of the table in accordance with rules 1-1 and 1-2 in table 1.

The embedding section 30 again performs Huffmann coding for the DCT coefficients (DCT blocks) of luminance element Y and the chroma elements Cr and Cb in which the data are embedded, and obtains compressed image data that can be decompressed using the JPEG method. The resultant image data are output to the image DB 24 (FIG. 2).

Components of Embedding Section 30

The components of the embedding section 30 will be described while again referring to FIGS. 3 and 4.

Decoder 300

Under the control of the controller 26 (FIG. 2), the decoder 300 (FIG. 3) performs Huffmann decoding for the JPEG data received via the camera IF 104 or the memory card IF 106. Then, from among the resulting three DCT coefficients (DCT blocks) that are obtained, the decoder 300 outputs to the encoder 304 the DCT coefficients (DCT blocks) for the chroma elements Cr and Cb, and outputs to the data embedding portion 32 the DCT coefficient (DCT block) for the luminance element Y.

Data Embedding Portion 32

The data embedding portion 32 embeds the data that were explained while referring to FIGS. 7 to 11.

The individual components of the data embedding portion 32 will now be described while referring to FIG. 4.

Image Divider 320

The image divider 320 divides the DCT coefficient (DCT block: FIG. 7A) of luminance signal Y received from the decoder 300 into the pairs in FIGS. 7B and 7C, and outputs the pairs to the coefficient operator 328.

Random Number Generator 322

The random number generator 322 uses the 16-bit linear congruence method to generate a random number RN by using, for example, a 64-bit key received from the key information DB 22 (FIG. 2). The obtained random number is transmitted to the positioning portion 324 and the scrambling portion 326.

Positioning Portion 324

For each pair obtained by the image divider 320, the positioning portion 324 determines which DCT coefficients in the two DCT blocks (blocks 1 and 2) are to be selected by using the random number RN received from the random number generator 322 (locations of selected DCT coefficients: FIG. 8). The position data that indicate the locations of the determined DCT coefficients are output to the coefficient operator 328.

Scrambling Portion 326

The scrambling portion 326 uses the random number RN received from the random number generator 322 to scramble the 96-bit data received from the embedded data generator 20 (FIG. 2).

As a result of the scrambling process, while 96 bits are regarded as one repetition unit, the scrambling portion 326 outputs, to the coefficient operator 328, data (hereinafter referred to as scrambled embedded data, or simply as embedded data) that include the 64 repetition units, each of which includes, in different orders, all 96 bits of the embedded data.

Embedding Table Preparation Process Performed by Coefficient Operator 328

The coefficient operator 328 first prepares the embedding table shown in FIG. 11.

Specifically, first, the coefficient operator 328 extracts the DCT coefficients (FIG. 8) from the two DCT blocks (blocks 1 and 2 in FIG. 7B) of each pair in accordance with the position data received from the positioning portion 324. Then, the coefficient operator 328 enters the DCT coefficients in the block 1 and 2 columns in the embedding table (FIG. 11), and enters the embedded data received from the scrambling portion 326 in the embedded data assignment column.

Data Embedding Process Performed by Coefficient Operator 328

Figure 12:
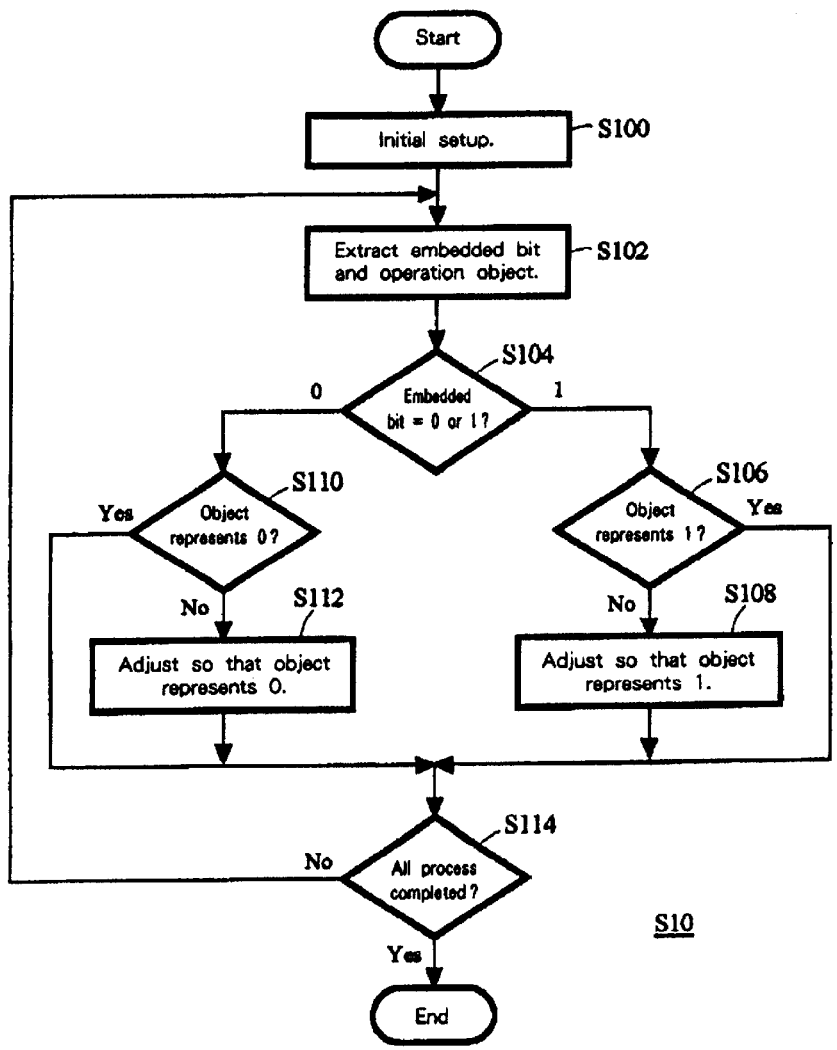
FIG. 12 is a flowchart showing the process performed by a coefficient operator in FIG. 4 when embedding data in a DCT block pair.

FIG. 12 is a flowchart showing the process (S10) performed by the coefficient operator 328 in FIG. 4 to embed data in the DCT block pair.

Next, the coefficient operator 328 embeds, in each DCT coefficient (DCT block) pair, the bits of corresponding data in the table (FIG. 11), and outputs, to the encoder 304 (FIG. 3), the data as the DCT coefficient Y' of the luminance element.

As is show n in FIG. 12, at step 100 (S100), the coefficient operator 328 sets, to an initial value of 1, variable i represents the 6144 pairs.

At step 102 (S102), the coefficient operator 328 extracts DCT coefficients ($A_1, A_2, B_1, B_2, C_1$ and $C_2$) for the i-th pair from the block 1 and 2 columns in the table (FIG. 11), and also extracts embedded bits from the embedded data assignment column.

At step 104 (S104), the coefficient operator 328 determines whether the value of the embedded bit extracted at step 102 is 1. When the bit value is 1, program control advances to S106, and when the bit value is 0, program control moves to S110.

At step 106 (S106), the coefficient operator 328 determines whether the object DCT coefficients satisfy rule 1-1 in table 1, i.e., whether they represent the value 1. When the DCT coefficients satisfy rule 1-1, as shown in FIG. 10, program control moves to S114. In the other cases, program control goes to S108.

At step 108 (S108), the coefficient operator 328 adjusts the object DCT coefficients so that they satisfy rule 1-1.

At step 110 (S108), the coefficient operator 328 determines whether the object DCT coefficients satisfy rule 1-2 in table 1, i.e., whether they represent the value 0. When the DCT coefficients satisfy rule 1-2, program control moves to S114. In the other cases, program control goes to S112.

At step 112 (S112), the coefficient operator 328 adjusts the object DCT coefficients so that they satisfy rule 1-2.

At step 114 (S114), the coefficient operator 328 determines whether the value of variable i is 6144, i.e., whether the data embedding process was completed for all the pairs. When all the data were embedded, the process is thereafter terminated. In the other cases, the variable i is incremented by one, and program control returns to S102.

Encoder 304

The encoder 304 (FIG. 3) performs Huffmann coding for the DCT coefficients of chroma elements Cr and Cb received from the decoder 300 and the DCT coefficients Y' of the luminance element Y, in which the data are embedded and received from the data embedding portion 32. The encoder 304 outputs the resultant data to the image DB 24.

Extraction Section 40

Figure 13:
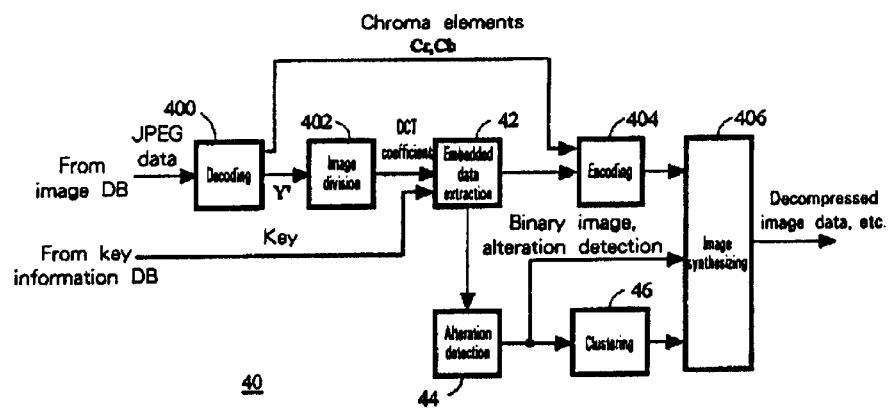
FIG. 13 is a diagram showing the arrangement of the extraction section in FIG. 2.

FIG. 13 is a diagram showing the arrangement of the extraction section 40 in FIG. 2.

Figure 14:
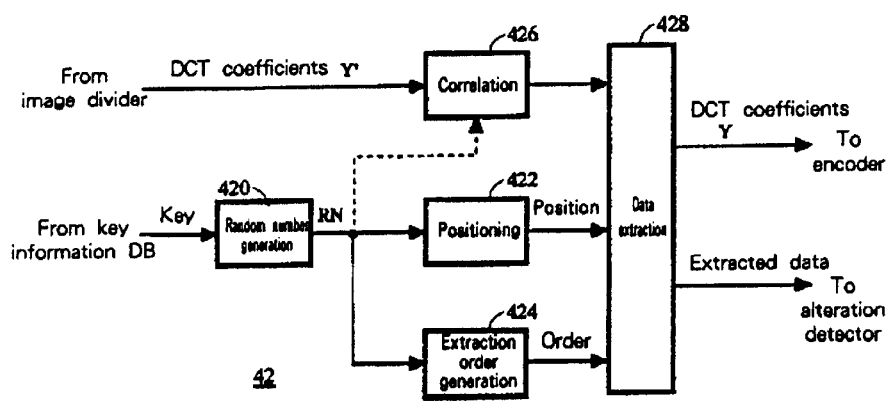
FIG. 14 is a diagram showing the arrangement of an embedded data extraction portion in FIG. 13.

FIG. 14 is a diagram showing the arrangement of an embedded data extraction portion 42 in FIG. 13.

As is shown in FIGS. 13 and 14, the extraction section 40 includes a decoder 400, an image divider 402, an encoder 404, an image synthesizer 406, the embedded data extraction portion 42, an alteration detector 44 and a clustering portion 46. The embedded data extraction portion 42 is constituted by a random number generator 420, a positioning portion 422, an extraction order generator 424, a correlating portion 426 and a data extractor 428.

Outline of Extraction Section 40

Figure 9:
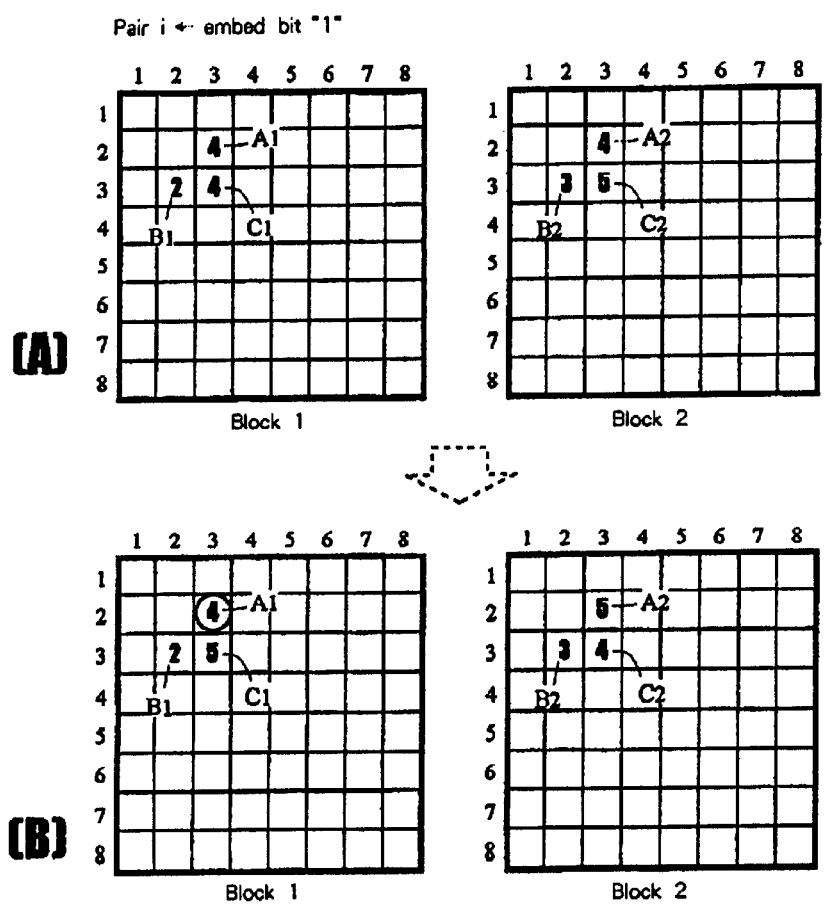
FIGS. 9A and 9B are diagrams for a case where the values of DCT coefficients for blocks 1 and 2 selected in FIG. 8 must be changed in order to embed a data bit (value 1) in pair i.

If an alteration is added to one part or all of the JPEG data in which the embedding section 30 has embedded data, as described while referring to FIGS. 7 to 12, the relationship of the values of the DCT coefficients ($A_1, A_2, B_1, B_2, C_1$ and $C_2$) which mutually correspond to each other in the two DCT blocks (blocks 1 and 2 in FIG. 7B) for each pair and were used to embed the data, does not indicate the value of a bit embedded during the process in FIGS. 9A, 9B and 10 in accordance with rules 1-1 and 1-2 in table 1.

The components of the extraction section 40 use the property of the JPEG data, including the embedded data, to determine whether the JPEG data generated by the embedding section 30 were altered. Further, if the JPEG data were altered, the extraction section 40 determines and displays an altered portion of the image data (FIG. 5).

Details of Extraction Section 40

The processing performed by the extraction section 40 will now be described in detail while referring to FIGS. 15 to 22.

As is described above, the embedding section 30 (FIGS. 2 and 3) uses the random number generated using a key received from the key information DB 22 to obtain, for each pair, the locations of the DCT coefficients used to embed data.

Therefore, the extraction section 40 can use the same key as the embedding section 30 to obtain, for DCT blocks (blocks 1 and 2 in FIG. 8) for each pair, the DCT coefficients that were used to embed data.

In addition, the embedding section 30 uses the random number generated using a key received from the key DB 22 to scramble the individual 96 bits of the embedded data and to correlate these bits with the pairs.

Therefore, the extraction section 40 can use the same key as the embedding section 30 to determine which bit of the 96-bit embedded data is correlated with each pair.

The extraction section 40 uses the same key as the embedding section 30 to obtain, for two DCT blocks (blocks 1 and 2) for each pair, DCT coefficients used to embed bits. In addition, the extraction section 40 extracts the bit value (1 or 0) of the data embedded in each pair, in accordance with which rule 1-1 and rule 1-2 in table 1 are satisfied by the relationship of the values of the mutually corresponding DCT coefficients used for bit embedding.

Next, the extraction section 40 uses the same key as the embedding section 30 to determine which bit of the embedded data corresponds to the bit value of the embedded data that are extracted from each pair.

FIG. 15A is a diagram showing an example image obtained by decompressing JPEG data in which data are embedded by the embedding section 30 (FIGS. 2 and 3). FIG. 15B is a diagram showing a portion to be altered in the image in FIG. 15A. FIG. 15C is a diagram showing the image after it is altered.

Assume that, as is shown in FIGS. 7 to 12, the embedding section 30 embeds, in the JPEG data, data obtained from the image data in FIGS. 5 and 6A to 6C; that a third party decompresses the resultant JPEG data to obtain the image of the car in FIG. 15A, and alters a portion indicated by the broken line in FIG. 15B to generate an image in which details of the car are partially deleted or corrected as is shown in FIG. 15C; and that the image data are again compressed and encoded using the JPEG method and the resultant data are used to replace the original JPEG data. In this case, since only one small part of the image data was altered, the values of many of the 64 values extracted from the 64 pairs correlated with the same bit of embedded data will be those that were held before the alteration, and only a small number of pairs will have values that were updated by the alteration.

The extraction section 40 uses such a property, accompanied by the alteration of one part of an image, to accept a majority bit decision while the bits extracted from the individual pairs are correlated with the bits of the embedded data. Then, if a value of 1 (or 0) is extracted from the majority of the 64 pairs correspond to the k-th bit of the embedded data and a value of 0 (or 1) is extracted from the minority of the pairs, it is assumed that the embedding section 30 embedded a value of 1 (or 0) as the k-th bit in the 64 pairs.

That is, the extraction section 40 accepts a majority bit decision based on the values of the extracted bits of embedded data, and assumes that the value held by the majority of pairs was the bit data value embedded in all the pairs by the embedding section 30. In addition, the extraction section 40 assumes that an alteration was added to a pair from which the value extracted corresponds to the value held by the minority of the pairs.

Figure 16:
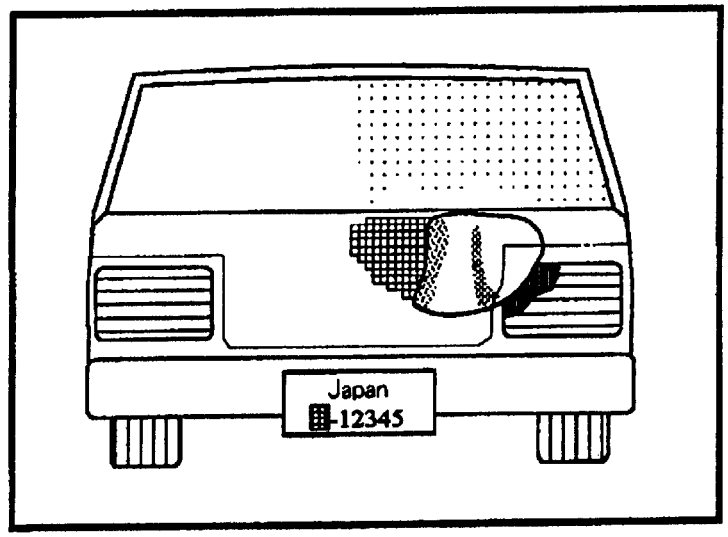
FIG. 16 is a diagram showing an image obtained by synthesizing an original image with a binary image that includes an altered portion.

FIG. 16 is a diagram showing an example where a binary image indicating altered portions is synthesized with the original image.

As is shown in FIG. 16, the extraction section 40 synthesizes the original image in FIG. 5 with the binary image (the center shaded area and the shaded area on the license number plate in FIG. 16) that indicates pairs to which alterations were added, and displays the altered areas on the display device 100 (FIG. 1).

Figure 17:
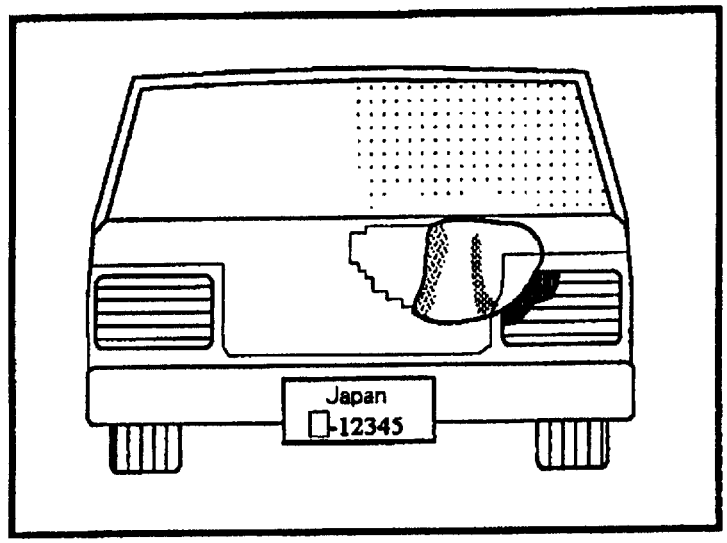
FIG. 17 is a diagram showing an image obtained with the clustering process by synthesizing the original image with an image that includes an altered portion.

FIG. 17 is a diagram showing an example where the original image is synthesized with an image obtained using a clustering process and that indicates the extent of the alterations.

As is shown in FIG. 17, the extraction section 40 performs the clustering process to obtain an image that indicates the extent of the tessellated areas of the binary image in FIG. 16, and synthesizes this image with the original image in FIG. 5 to display the altered areas on the display device 100.

To perform this process, first, the extraction section 40 performs Huffmann decoding for the JPEG data received from the image data DB 22, and obtains three types of DCT coefficients (DCT blocks). The extraction section 40 then extracts 12288 DCT coefficients (DCT blocks Y') for luminance element Y, and forms 6144 pairs of adjacent DCT coefficients, as shown in FIGS. 7B and 7C. The extraction section 40 determines which of the rules 1-1 and 1-2 is satisfied by the relationship of the DCT coefficients used to embed data in the two DCT blocks (blocks 1 an 2 in FIG. 8) included in each pair. The extraction section 40 then extracts the bit value (1 or 0) of the data (second embedded data) embedded in each pair.

If the DCT coefficients correspond to the two DCT blocks (blocks 1 and 2) are equal (e.g., $A_1 = A_2$), neither rule 1-1 nor rule 1-2 applies, so the extraction section 40 determines that an alteration was added to the pertinent pair. To simplify the following explanation, an example where the corresponding DCT coefficients are not equal is used.

FIG. 18 is a diagram showing the bit values extracted from the pairs in the JPEG data, by the extraction section 40, when no alteration or error was added to the JPEG data generated by the embedding section 30 (FIGS. 2 and 3).

The extraction section 40 extracts bits of the embedded data from the pairs (second image blocks), in the JPEG data, that were generated by the embedding section 30 and to which no alteration or error was added. When the values of the bits are rearranged in accordance with the correlation of the bits with the pairs, the values of all the extracted bits correspond to the embedded data match.

Figure 19:
FIG. 19 is diagram showing a table indicating the value of a bit that the extraction section extracts from each pair included in JPEG data, which are generated by the embedding section (FIGS. 2 and 3) and to which an alteration or an error was added.

FIG. 19 is a diagram showing bit values extracted from the pairs in the JPEG data, by the extraction section 40, when an alteration or error is added to JPEG data generated by the embedding section 30 (FIGS. 2 and 3).

The extraction section 40 extracts the bits of the embedded data from the pairs (second image blocks), in the JPEG data, that were generated by the embedding section 30 and to which an alteration or an error was added. When the bit values of the embedded data are rearranged in accordance with the correlation of the bits of the data with the pairs in the same manner as in FIG. 18, as shown by the extracted values enclosed by thick frames in FIG. 19, the bits extracted from the minority of the pairs, for which an alteration was performed, have different values from the bits extracted from the non-altered, majority of pairs. As a result, a match is not obtained.

The extraction section 40 thus assumes that the bit values obtained by the majority bit decision are the values of the data embedded by the embedding section 30.

Figure 15:
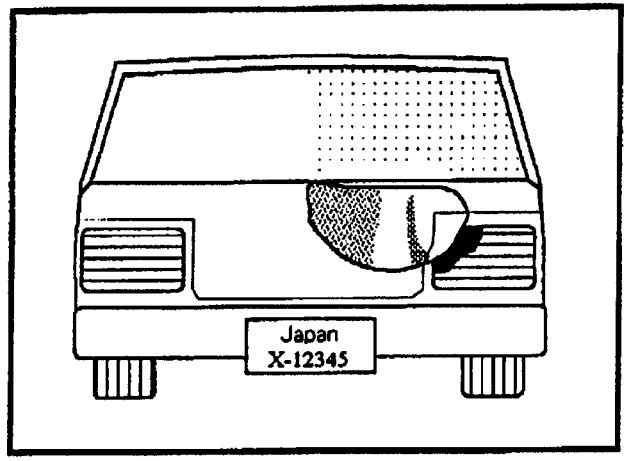
FIG. 15A is a diagram showing an image obtained when the embedding section (FIGS. 2 and 3) decompresses the JPEG image data in which data are embedded.
FIG. 15B is a diagram showing an alteration added to the image in FIG. 15A.
FIG. 15C is a diagram showing an image after it was altered.
Figure 15:
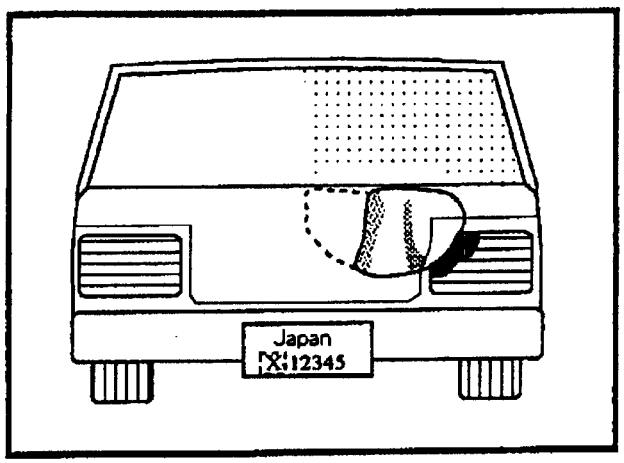
Figure 15:
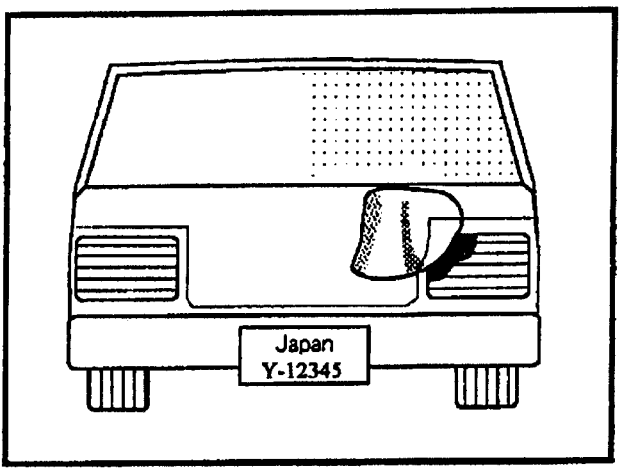
Figure 20:
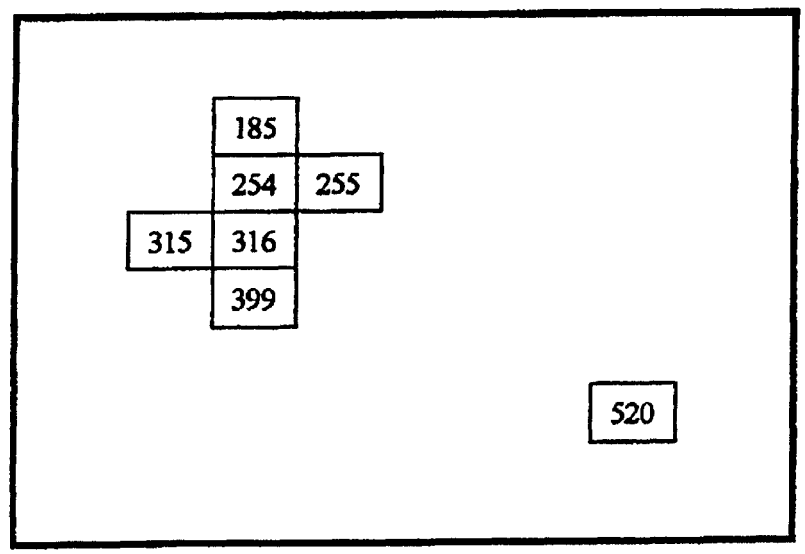
FIG. 20 is a diagram showing a binary image obtained when the extraction section (FIGS. 13 and 14) determines that, as shown in FIG. 19, a pair which was altered is selected from altered JPEG data in FIG. 15, and indicates the location in the image of the altered pair.

FIG. 20 is a diagram showing an example binary image. In this example, the extraction section 40 (FIGS. 13 and 14) uses the JPEG data altered as is shown in FIG. 15 to examine pairs that are altered as is shown in FIG. 19, and the location in the image of the altered pairs is indicated in the binary image. For the sake of convenience while giving the explanation, the example in FIG. 20 does not always match the example in FIG. 15.

As is shown in FIG. 20, the extraction section 40 generates a binary image that indicates the location on the screen of the pairs from which bits were extracted whose values differ from the value selected by the majority bit decision.

As is described above while referring to FIG. 16, the binary image generated by the extraction section 40 is synthesized with the original image, and the obtained image is displayed on the display device 100 (FIG. 1).

FIGS. 21A to 21D are diagrams showing an example clustering image. In this example, the extraction section 40 (FIGS. 13 and 14) uses the JPEG data that are altered as in FIG. 15 to determine the pairs altered as in FIG. 19, and the extent of the areas occupied by the pairs is indicated by the clustering image. For the sake of convenience while giving the explanation, the examples in FIGS. 21A to 21D do not always match the example in FIG. 15.

As is shown in FIGS. 21A and 21C, the extraction section 40 determines the extent of the areas on the screen occupied by the pairs from which bits were extracted whose values differ from the value selected by the majority bit decision, and generates the clustering image shown in FIGS. 21B and 21D.

As is described above while referring to FIG. 17, the clustering image generated by the extraction section 40 is synthesized with the original image, and the resultant image is displayed on the display device 100 (FIG. 1).

Components of Extraction Section 40

The components of the extraction section 40 will be described while again referring to FIGS. 13 and 14.

Decoder 400

Under the control of the controller 26, the decoder 400 performs Huffmann decoding for the JPEG data received from the image DB 24. Then, from among the obtained three types of image elements, the decoder 400 outputs chroma elements Cr and Cb to the encoder 404, and outputs the luminance element Y' to the image divider 402.

Image Divider 402

The image divider 402 divides the received luminance element Y' into DCT coefficients (DCT blocks), and outputs the DCT coefficients (DCT blocks) to the embedded data extraction portion 42.

Embedded Data Extraction Portion 42

The embedded data extraction portion 42 correlates each two of the DCT blocks for the luminance element Y' that are received from the image divider 402 and forms the pairs (FIGS. 7B, 7C and 8) used by the embedding section 30. The embedded data extraction portion 42 extracts the values of the data bits embedded in the pairs, and outputs the bit values to the alteration detector 44 as the extracted data in FIGS. 18 and 19.

In addition, the embedded data extraction portion 42 outputs to the encoder 404, unchanged, the received Luminance element Y' as a luminance element Y.

Correlating Portion 426

The correlating portion 426 (FIG. 14) correlates each two adjacent DCT blocks (blocks 1 and 2: FIG. 7B) in 12288 DCT coefficients (DCT blocks) received from the image divider 402, and generates 6144 pairs of DCT coefficients (FIGS. 7B and 7C). Then, the correlating portion 426 outputs the 6144 pairs to the data extractor 428.

That is, the correlating portion 426 corresponds to the image divider 320 (FIG. 4) of the embedding section 30 (FIGS. 2 and 3), and, as does the image divider 320, generates pairs of DCT blocks.

Random Number Generator 420

The random number generator 420 receives, from the key information DB 22 (FIG. 2), the same key as is used by the embedding section 30 for embedding data, and uses that key and the same method as is used by the embedding section 30 to generate a random number RN. The random number generator 420 outputs the obtained random number RN to the positioning portion 422 and to the extraction order generator 424.

That is, the random number generator 420 corresponds to the random number generator 322 (FIG. 4) of the embedding section 30, and uses the same key and the same method as those used by the random number generator 322 to generate the random number RN.

Positioning Portion 422

The positioning portion 422 uses the received random number RN to generate position data indicating which DCT coefficients, of the two DCT blocks (blocks 1 and 2) included in each pair, were used by the embedding section 30 to embed data. The positioning portion 422 then outputs the position data to the data extractor 428.

That is, the positioning portion 422 corresponds to the positioning portion 324 of the embedding section 30, and uses the same random number as the one used by the positioning portion 324 to generate the same position data as those generated by the positioning portion 324.

Extraction Order Generator 424

As is described above, 6144 pairs transmitted from the correlating portion 426 to the data extractor 428 are formed into sets, each of which includes 96 pairs. In an order differing for each set, each bit of the 96-bit embedded data is individually correlated with one of the 96 pairs in each set.

The extraction order generator 424 uses the received random number RN to generate order data indicating the order in which the 96 bits of the embedded data are individually correlated with the pairs in each of the pair sets. The extraction order generator 424 then outputs the order data to the data extractor 428.

For the two DCT blocks (blocks 1 and 2) included in each pair, the data extractor 428 determines which of the rules 1-1 and 1-2 is satisfied by the relationship of the values of the mutually corresponding DCT coefficients (FIG. 8), which are indicated by the position data received from the positioning portion 422. The data extractor 428 then extracts the values of the bits of data embedded in each pair.

Furthermore, the data extractor 428 rearranges the extracted bit values in the order corresponding to that expressed by the order data received from the extraction order generator 424, and generates the extraction data in FIGS. 18 and 19. The data extractor 428 then outputs the extraction data to the extraction order generator 424.

Figure 22:
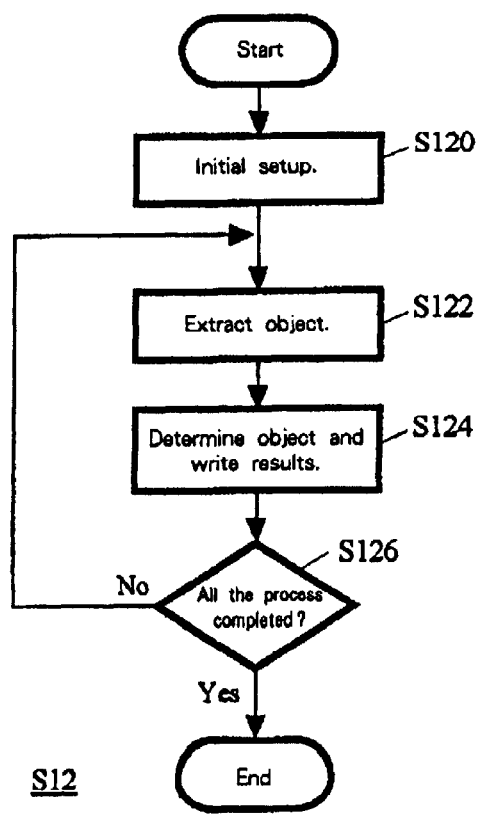
FIG. 22 is a flowchart showing the process performed by the data extraction section in FIG. 14 to extract a bit of data from each pair.
Figure 21:
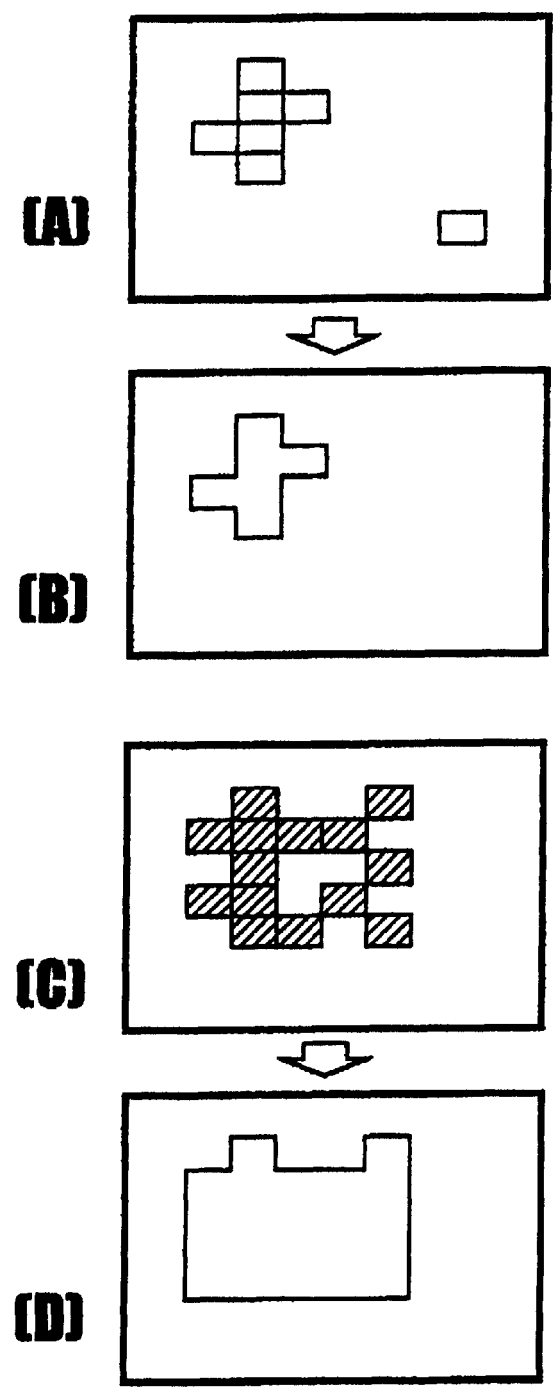
FIGS. 21A to 21D are diagrams showing a clustering image obtained when the extraction section (FIGS. 13 and 14) determines a pair, altered as shown in FIG. 19, is selected from altered JPEG data in FIG. 15, and indicates the extent of the image area occupied by the altered pair.

The bit extraction process performed by the data extractor 428 will be further described while referring to FIG. 22.

FIG. 22 is a flowchart showing the process performed by the data extractor 428 in FIG. 14 when extracting data bits embedded in the individual pairs.

As is shown in FIG. 22, at step 120 (S120), for initialization, the data extractor 428 loads a 1 into variable i, which represents the 6144 pairs.

At step 122 (S122), the data extractor 428 extracts, as an object, the i-th pair indicated by variable i.

At step 124 (S124), for the two DCT blocks (blocks 1 and 2) included in the extracted pair, the data extractor 428 determines which of the rules 1-1 and 1-2 is satisfied by the relationship of the DCT coefficients indicated by the position data received from the positioning portion 422. When the relationship corresponds to rule 1-1, bits of value 1 are extracted from the i-th pair. When the relationship corresponds to rule 1-2, bits of value 0 are extracted from the i-th pair.

Further, the data extractor 428 uses the order data received from the extraction order generator 424 to determine a bit of embedded data corresponds to the value of the extracted bit. The values (1 and 0) of the extracted bits are entered at the obtained locations in the extracted data diagrams in FIGS. 18 and 19.

At step 126 (S126), the data extractor 428 determines whether the number held by variable i is 6144, i.e., whether the bit extraction process was completed for all the pairs. When the bit extraction was completed, the processing is thereafter terminated. In the other cases, the variable i is incremented by one and program control returns to S122.

When the bit extraction process to extract the data in FIGS. 18 and 19 was completed for all the pairs, the data extractor 428 accepts a majority bit decision based on the 64 values that were extracted for each of the 96 corresponding embedded data bits, and assumes the data was embedded by the embedding section 30 (FIGS. 2 and 3). The data extractor 428 then outputs each pair as luminance element Y to the encoder 404.

Encoder 404

The encoder 404 (FIG. 3) performs Huffmann coding for the chroma elements Cr and Cb received from the decoder 400 and the luminance element Y received from the data extractor 428, and generates JPEG data. The encoder 404 outputs the JPEG data to the image synthesizer 406.

Alteration Detector 44

The alteration detector 44 uses the extraction data (FIGS. 18 and 19) received from the data extractor 428 to generate the binary image in FIG. 20, and then outputs the binary image to the image synthesizer 406.

Clustering Portion 46

Upon receiving the binary image from the alteration detector 44, the clustering portion 46 generates a clustering image (FIG. 21) by which the extent of an alteration is indicated, and outputs the clustering image to the image synthesizer 406.

Image Synthesizer 406

Under the control of the controller 26, the image synthesizer 406 decompresses the JPEG data received from the encoder 404, generates an image shown in FIG. 5 or 15C, and displays the produced image, unchanged, on the display device 100 (FIG. 1).

Or, the image synthesizer 406 synthesizes the binary image received from the alteration detector 44, or the clustering image received from the clustering portion 46, with the image obtained by decompression, and generates the image shown in FIG. 16 or 17. The image synthesizer displays the altered portion in the image on the display device 100.

Or, the image synthesizer 406 displays, unchanged, the binary image received from the alteration detector 44, or the clustering image received from the clustering portion 46, on the display device 100 to indicate the extent of the image alteration.

Data Embedding Process Performed by Image Alteration Determination Apparatus 1

Figure 23:
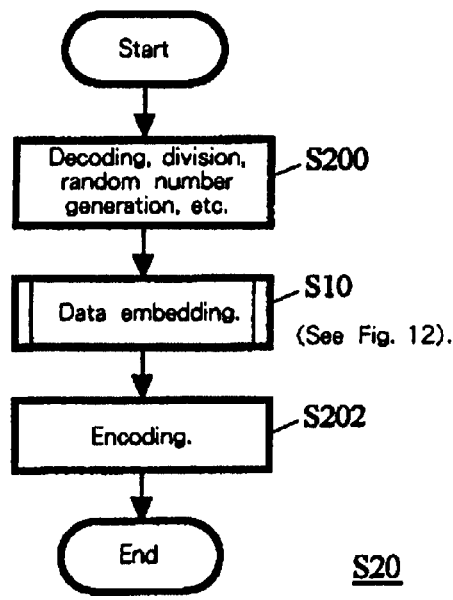
FIG. 23 is a flowchart showing the data embedding process (S20) performed by the image alteration determination apparatus in FIG. 1.

The overall data embedding process performed by the image alteration determination apparatus 1 will now be described while referring to FIG. 23. FIG. 23 is a flowchart showing the data embedding process (S20) performed by the image alteration determination apparatus 1 in FIG. 1.

At step 200 (S200), the decoder 300 (FIG. 3) performs Huffmann decoding for the JPEG data received via the camera IF 104, and outputs, to the data embedding portion 32, 12288 DCT coefficients (DCT blocks) for luminance element Y.

The image divider 320 divides the received DCT coefficients (DCT blocks: FIG. 7A) into 6144 pairs (FIGS. 7B and 7C), and outputs the pairs to the coefficient operator 328.

The random number generator 322 generates a random number RN using a key received from the key information DB 22 (FIG. 2), and outputs the random number RN to the positioning portion 324 and the scrambling portion 326.

The positioning portion 324 uses the received random number RN to generate position data that indicates the locations of the DCT coefficients used for data embedding. The positioning portion 324 then- outputs the position data to the coefficient operator 328.

The scrambling portion 326 uses the random number RN to scramble the 96-bit data received from the embedded data generator 20 (FIG. 2), and then outputs the scrambled data to the coefficient operator 328.

At step 10 (S10), first, based on the position data received from the positioning portion 324, the coefficient operator 328 (FIG. 4) selects, for each pair, DCT coefficients ($A_1$, $A_2$, $B_1$, $B_2$, $C_1$ and $C_2$: FIG. 8) that are the data embedding objects.

Furthermore, the coefficient operator 328 correlates each pair with one bit of the embedded data received from the scrambling portion 326, and prepares the embedding table in FIG. 11.

In addition, the coefficient operator 328 sequentially extracts, from the table, the object DCT coefficients and the bits to be embedded, and embeds the bits of the data in the individual pairs, as shown in FIGS. 9A, 9B and 10, in accordance with the rules 1-1 and 1-2 in table 1.

When bits were embedded in all the pairs, at step 202 (S202), the encoder 304 (FIG. 3) performs Huffmann coding for the DCT coefficients (DCT blocks) for luminance element Y and the DCT coefficients for the other elements received from the decoder 300, and generates the JPEG data. The encoder 304 then outputs the JPEG data to the image DB 24 (FIG. 2).

The JPEG data from the embedding, section 30 are stored and managed in the image DB 24.

Data Extracting Process Performed by Image Alteration Determination Apparatus 1

The overall data extracting process performed by the image alteration determination apparatus 1 will now be described while referring to FIG. 24.

Figure 24:
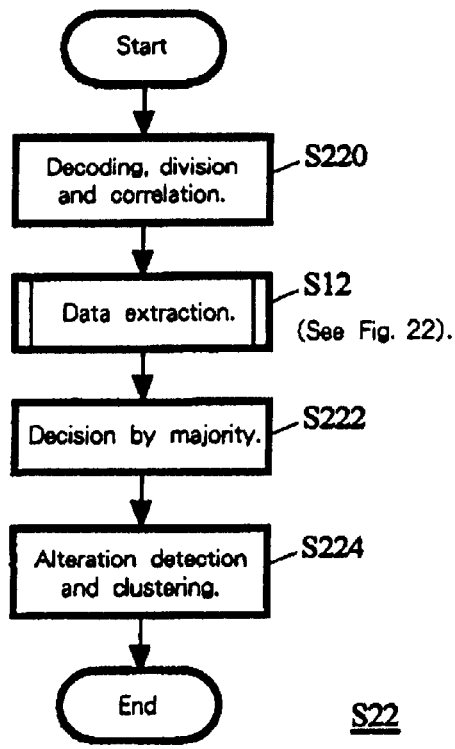
FIG. 24 is a flowchart showing the embedded data extraction process (S22) performed by the image alteration determination apparatus in FIG. 1.

FIG. 24 is a flowchart showing the data extracting process (S22) performed by the image alteration determination apparatus 1 in FIG. 1.

At step 220 (S220), the decoder 400 (FIG. 13) performs Huffmann decoding for JPEG data supplied from the image DB 24, and outputs luminance element Y' to the image divider 402.

The image divider 402 divides the luminance element Y' into 12288 DCT coefficients (DCT blocks), and outputs them to the embedded data extraction portion 42.

At the embedded data extraction portion 42, the correlating portion 426 correlates each set of two adjacent DCT coefficients (DCT blocks: FIG. 7A) to prepare 6144 pairs (FIGS. 7B and 7C), and outputs the pairs to the data extractor 428.

The random number generator 420 (FIG. 14) generates a random number RN using a key received from the key information DB 22 (FIG. 2), and outputs the number to the positioning portion 422 and the extraction order generator 424.

The positioning portion 422 uses the random number RN received from the random number generator 420 to generate position data representing the locations of the DCT coefficients used for data embedding. The positioning portion 422 then outputs the position data to the data extractor 428.

The extraction order generator 424 uses the random number RN received from the random number generator 420 to generate order data representing the correlation of each pair with an embedded data bit. The extraction order generator 424 then outputs the order data to the data extractor 428.

At step 12 (S12), as is shown in FIG. 22, the data extractor 428 sequentially extracts pairs, and extracts the values of the bits embedded in the pairs, in accordance with the rule, 1-1 or 1-2, that is satisfied by the relationship of the values of the DCT coefficients of the two DCT blocks (blocks 1 and 2) specified by the position data received from the positioning portion 422. Furthermore, the data extractor 428 uses the order data received from the extraction order generator 424 to determine which bit in the embedded data corresponds to the extracted bit value. The data extractor 428 writes the extracted bit value (1 or 0) at the position in the extracted data (FIGS. 18 and 19) obtained as the result of the determination.

When the values of the bits were extracted from all the pairs, at step 222 (S222), for the extracted data in FIGS. 18 and 19, the data extractor 428 accepts a majority bit decision based on the 64 values extracted for the corresponding bits of the 96-bit data. As a result, the data extractor 428 makes an assumption as to the data embedded by the embedding section 30 (FIGS. 2 and 3).

Furthermore, the encoder 404 (FIG. 13) performs Huffmann coding for the chroma elements Cr and Cb received from the decoder 400 and the luminance element Y received from the embedded data extraction portion 42, and generates the JPEG data. The encoder 404 then outputs the JPEG data to the image synthesizer 406.

At step 224 (S224), the alteration detector 44 generates the binary image shown in FIG. 20 using the extracted data (FIGS. 18 and 19) received from the data extractor 428, and outputs the binary image to the image synthesizer 406.

The clustering portion 46 uses the binary image received from the alteration detector 44 to generate a clustering image (FIG. 21) that indicates the extent of the alteration that was made. The clustering portion 46 then outputs the clustering image to the image synthesizer 406.

Under the control of the controller 26, the image synthesizer 406 synthesizes the binary image received from the alteration detector 44, or the clustering image received from the clustering portion 46, with the image obtained by decompression. The image synthesizer 406 then generates the image shown in FIG. 16 or 17, and displays the altered portion of the image on the display device 100.

Modification

A modification of the embodiment of the present invention will now be described.

Image Data Area

In the above embodiment, the data in the entire area occupied by the image data is divided into pairs, and all the image data in the area is examined to determine whether it was altered. However, the division into pairs and the alteration determination may be performed for only a part of the image data, or the area in which the division into pairs is effected may not correspond to the area in which the alteration determination is performed.

Transformation Method Other Than the DCT Process

In the above embodiment, the DCT process is performed to compress and encode image data. However, the alteration determination method of the present invention can be applied not only for the DCT process, but substantially, can also be applied for the compression and encoding of image data by using a spatial or frequency transformation, such as Wavelet transformation, Fourier transformation and FFT (Fast Fourier Transformation), to transform spatial data into frequency data.

Embedding Data in a Portion Other Than a Luminance Element

In the above embodiment, the data are embedded in the DCT coefficient for the luminance element Y. The alteration determination method of the present invention can also be used for embedding data in chroma elements Cr and Cb.

Further, the alteration determination method of the present invention can be applied for other image data, such as RGB image data.

Correlation of DCT Blocks

In the above embodiment, each set of two adjacent DCT coefficients are correlated with each other. However, using a random number, two DCT coefficients (DCT blocks) can be selected at random from the 12288 DCT blocks and can be correlated with each other to form a pair.

As is indicated by the broken line in FIG. 4, the random number generator 322 can supply a random number RN to the image divider 320, which can then use the random number RN to select two DCT coefficients (DCT blocks) to form a pair.

As is indicated by the broken line in FIG. 14, the random number generator 420 can supply a random number RN to the correlating portion 426, and the correlating portion 426 can use the random number RN to reproduce a pair that is correlated by the image divider 320.

The embedded data scrambling method is not limited to the method used in this embodiment, and a method may be used according to which individual bits of embedded data are assigned to all the pairs a constant number of times.

Application for Data Other Than Image Data

When the embedding/judging program 2 of the present invention is properly modified, in addition to image data, the program can be used to determine whether portions of such content data as audio data were altered.

An explanation will now be given for a case where the present invention is applied for audio data.

Audio data can be processed by using sequential sampling points as a block. When, for example, 1024 sets of audio data having a sampling frequency of 44.1 Khz are defined as a block, 44 audio data blocks can be processed in one second.

When an FFT is used to transform these audio data blocks into data blocks in a frequency area, data can be embedded in the same manner as in the above embodiment, and an alteration can be detected by using the embedded data.

Method for Connecting a Plurality of Alteration Determination Apparatuses 1

Figure 25:
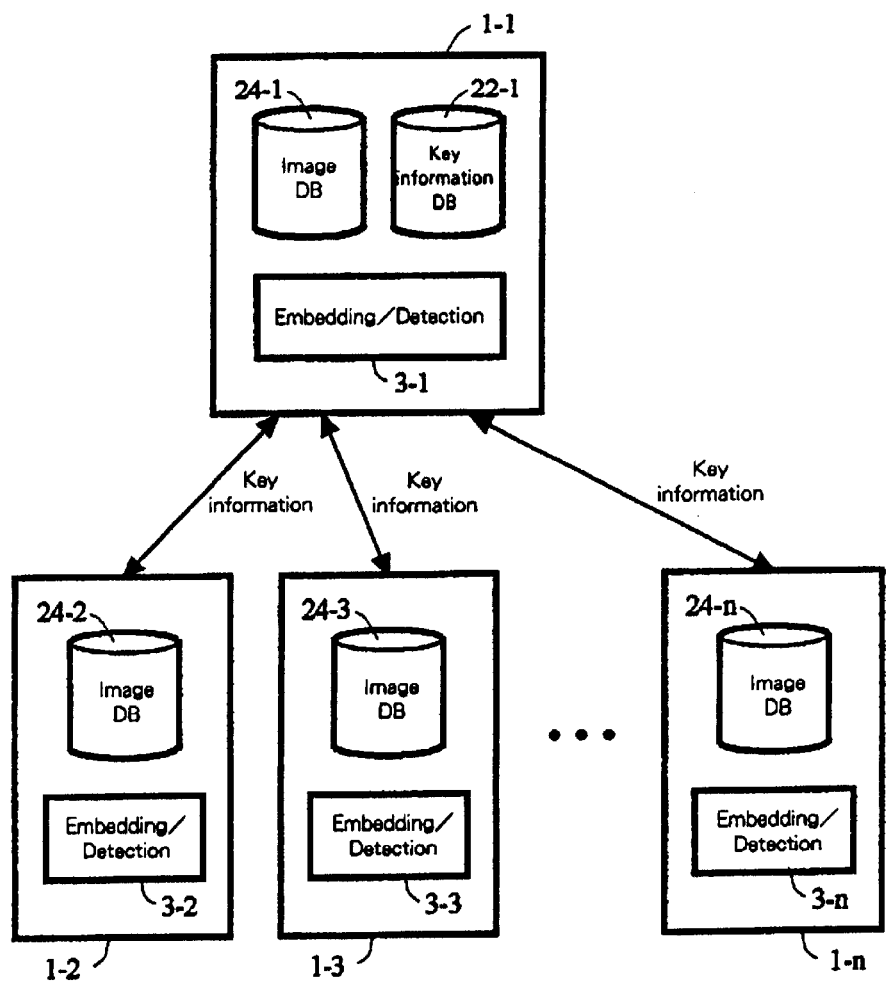
FIG. 25 is a diagram showing the arrangement of an alteration determination system in which a plurality of image alteration determination apparatuses that include an image DB are connected together.

FIG. 25 is a diagram showing the arrangement of an alteration determination system 4 where a plurality of image alteration determination apparatuses 1 (1-1 to 1-n), each of which include an image DB 24 (24-1 to 24-n), are connected together.

Assume that, as is shown in FIG. 25, the image alteration determination apparatuses 1-1 to 1-n, which respectively include the image DBs 24 (24-1 to 24-n) and the embedding/extraction units 3 (3-1 to 3-n), are connected via the communication device 116 (FIG. 1; not shown in FIG. 25). In order to detect image data alterations, overall management of image data, stored and managed in the image DBs 24-1 to 24-n, and keys is effected using the key information DB 22-1 of the image alteration determination apparatus 1-1; and the keys are distributed to the image alteration determination apparatuses 1-1 to 1-n so that security can be maintained.

Content Data Judging Apparatus

An explanation will now be given for a content data judging apparatus that is used for a security maintenance system, so that content data prepared by a digital device can be handled as evidence data. The tamper proof technique used in the following explanation is a well known technique for protecting a software/hardware module, including a highly confidential algorithm, from reverse engineering, such as is performed by a disassembler. RC4 is a well known cryptographic algorithm that was devised by Ron Rivest (RSA Data Security Inc.). No explanation will be given for that algorithm.

Figure 26:
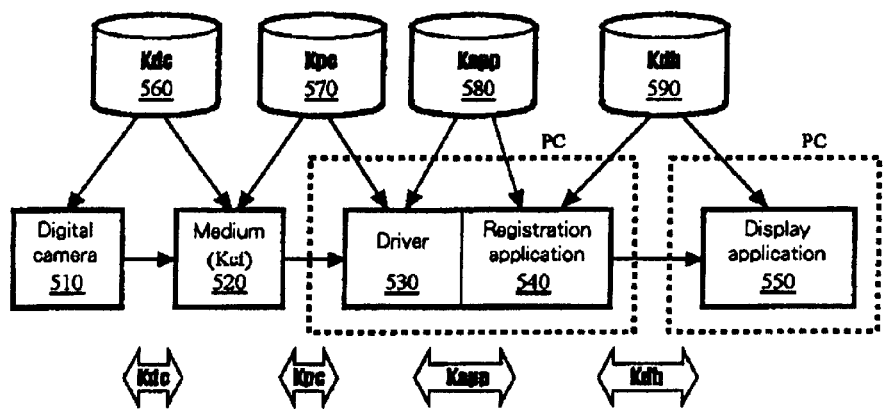
FIG. 26 is a block diagram showing a data judging apparatus.

FIG. 26 is a block diagram illustrating a data judging apparatus according to the present invention. A JPEG image acquired by a digital camera 510 can be stored in a storage device (e.g., on a hard disk) via a device driver program 530 (hereinafter referred to simply as a driver), without its validity being compromised by an alteration or a substitution. The validity of the JPEG image data is examined at the PC by an application 550, and the results are displayed. If the JPEG image was altered, the altered portion is identified. It should be noted that the JPEG image acquired by the digital camera 510 is protected by a plurality of authentication processes performed for the components 510 and 520, using a key (Kdc); for the components 520 and 530, using a key (Kpc), and for the components 530 and 540, using a key (Kapp). Since a high level of security is maintained, the suitability of the digital content to serve as evidence can be drastically increased. The PC that executes the driver 530 and the registration application 540 for embedding an electronic watermark may be an electronic watermark embedding apparatus, or the PC that executes the application 550 for extracting an embedded electronic watermark and for identifying an altered portion of the JPEG image may be a dedicated electronic watermark extraction apparatus. Further, the same PC may be used for the embedding and the extraction of an electronic watermark.

Figure 46:
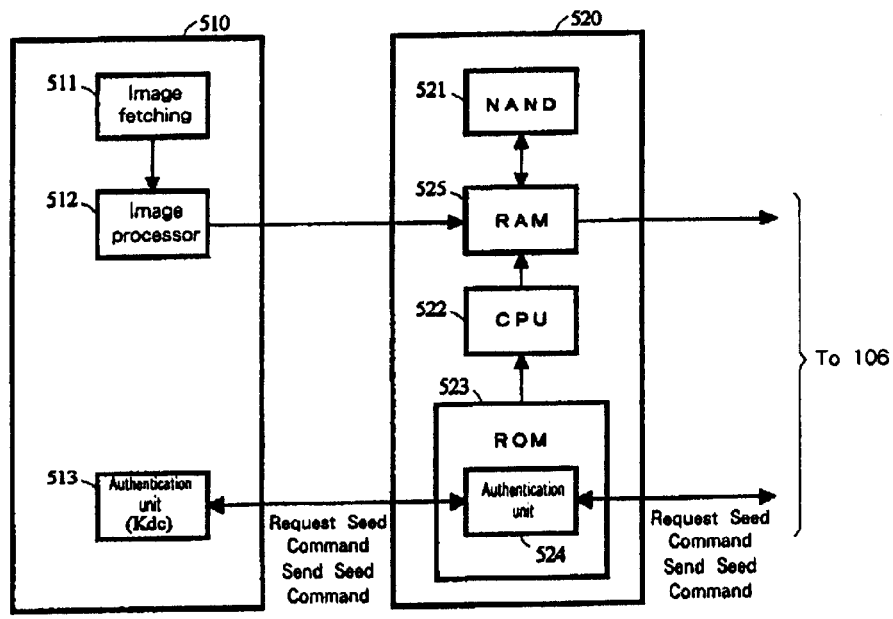
FIG. 46 is a hardware block diagram showing the digital camera 510 and the CF 520 of the present invention.

FIG. 46 is a hardware block diagram illustrating the digital camera 510 and a CF 520 used for the present invention. First, specific common commands (a Request Seed command and a Send Seed command) are defined between the digital camera 510, the CF 520 and the driver 530. Upon receiving these commands, the general apparatus returns an error or enters a time out. The Request Seed command is a command for requesting the transmission of a seed to a client, and the Send Seed command is a command for notifying a client of the transmission of a seed. The authentication is performed by the devices exchanging these commands and determining whether a requested series was returned.

The digital camera 510 and the CF 520 use the common key Kdc, which is stored in the ROM area of the digital camera 510. The key Kdc is also encrypted using the key Kcf of the CF 520 and is stored in a NAND area 521 (Readable/writable memory area) of the CF 520 because the CF used by a specific digital camera may also be used by another digital camera. The key Kdc in the CF 520 is held as information indicating with which digital camera the key Kdc is used in the initial state. It should be noted that the key Kdc can be changed during the initialization process. The key Kcf is used to specify the CF 520, which includes a RAM area 525 and the NAND area 521 as memory areas. The RAM area 525 is used temporarily for the exchange of data, and the NAND area 521 is used primarily for the storage of image data and key information. A CPU 522 performs calculations and comparisons for the generation of a random number and for encryption (RC4). The key Kdc is encrypted by using the key Kcf, raw image data (JPEG), the encrypted data obtained from divided image data, the key Kpc, a digital camera ID file, a user ID file, a photo acquisition date, and the serial number of the CF 520 stored in the NAND area 521 of the CF 520. The encrypted key and data stored in the NAND area 521 differ from the data in the RAM area 525, and can not be decoded by reading these data using a normal method. Key databases 560, 570, 580 and 590 are used to manage key information, which is to be stored in the individual devices, that the individual devices use to perform authentication. A digital camera ID and a secret key Kdc are stored in the key database 560, and a user Id and a secret key Kpc are stored in the key database 570. These data bases are used to initialize the CF 520 before it is installed in the digital camera. The initialization process is performed in the following manner.

(1) The user ID is stored in the RAM area 525 of the CF 520.
(2) The key Kpc is stored in the NAND area 521 of the CF 520.
(3) The device ID file is stored in the NAND area 521 of the CF 520.
(4) The key Kdc is stored in the NAND area 521 of the CF 520.

The keys Kdc and Kpc, which are stored in the NAND area 521, are used to prepare a series that is used by the devices to perform an authentication process. The thus initialized CF 520 and the digital camera perform the authentication process and store data in the following manner. First, an authentication unit 513 in the digital camera 510 and an authentication unit 523 in the CF 520 use the common key Kdc to perform an authentication process. If the authentication process is successful, the digital camera 510 uses an image fetching unit 511 constituted by a CCD, etc., to generate an image signal, and transmits the image signal to an image processor 512. The image processor 512 then reproduces the image signal to obtain image data, and writes the image data in the NAND area 521 of the CF 520. Paralleling this process, each 512 bytes of the image data are encrypted as needed by using the key Kcf and the serial number of the CF 520, and the resultant data are written as encrypted data in the NAND area 521. It is preferable that the ROM area 523 be a tamper proof area. When an image is held in the CF 520, it means that the image data and the encrypted data obtained from the divided image data are stored in the NAND area 521.

Figure 31:
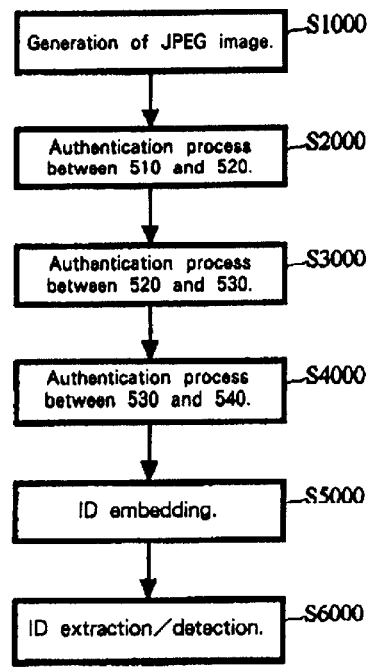
FIG. 31 is a main flowchart for a data judging method.

FIG. 31 is a main flowchart for the data judging method.

At step S1000 a JPEG image is generated by the digital camera 510, and program control then goes to step S2000. At step S2000, an authentication step for the components 510 and 520, an authentication process is performed between the digital camera 510 and the CF 520 and the results and the JPEG image are stored in the CF 520. At step S3000, for an authentication step for the components 520 and 530, an authentication process is performed between the CF 520 and the driver 530 and the results are transmitted to the components 530 and 540, for an authentication process to be performed at step S4000. At step S4000 an authentication process is performed between the CF driver 530 and the JPEG image registration/storage application 540 and the results are transmitted to the components 540 and 550, for an authentication process to be performed at step S5000. At step S5000, an embedding step for an ID, etc., the results of the authentication processes at steps S2000, S3000 and S4000 are displayed, and an ID and an alteration detection mark are embedded in the JPEG image. At step S6000, a step for the extraction/detection of an ID, etc., the ID and the alteration detection mark are extracted from the JPEG image and the results are displayed. When an alteration is found, the pertinent altered portion is also displayed.

Figure 32:
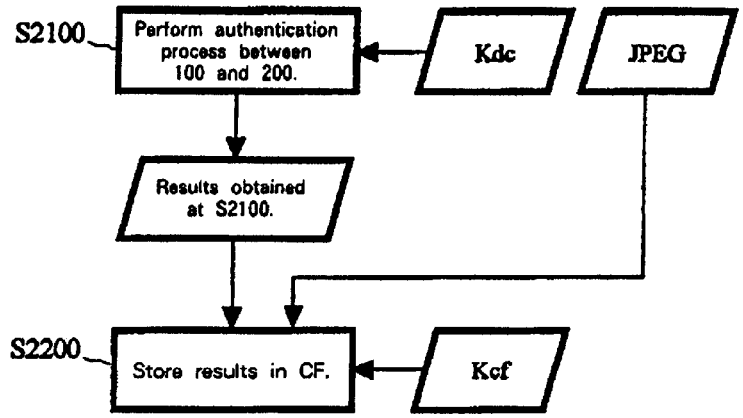
FIG. 32 is a flowchart for an authentication process performed at step S2000 by components 510 and 520.

FIG. 32 is a flowchart for the authentication process performed at step S2000 between the components 510 and 520.

At step S2100, at which an authentication process is performed between the components 510 and 520, the digital camera 510 and the CF 520 use the key. Kdc to perform the authentication process, and output the JPEG image obtained at step S1000 and the results of the authentication process. At step S2200, a step for storing the JPEG image, the JPEG image storage key Kcf is used to store the results obtained at step S2100 and the JPEG image in the CF 520.

Figure 33:
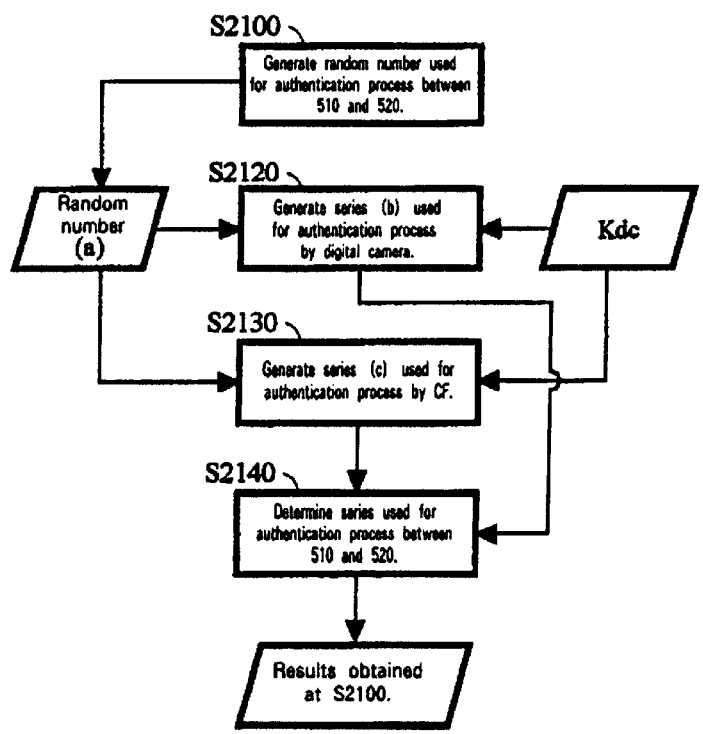
FIG. 33 is a detailed flowchart for an authentication process performed at step S2100 by components 510 and 520.

FIG. 33 is a detailed flowchart for the authentication process performed at step S2100 between the components 510 and 520.

First, at step S2100 the CF 520 generates a series (a) of random numbers, and transmits this series to the digital camera 510. At step S2120 the digital camera 510 encrypts the received series (a) using the key Kdc, and generates a series (b). At step S2130 the CF 520 uses the key Kdc to encrypt the random numbers (a) using RC4 (the calculations are performed by the CPU 522 of the CF 520 in FIG. 46), and generates a series (c). At step S2140 the CF 520 compares the obtained series (c) with the series (b) that was obtained by the digital camera 510. When the two series correspond, it is ascertained that the authentication process performed between the digital camera 510 and the CF 520 was successful because the key Kdc was used in common by the two devices. When the two series differ, it is ascertained that the authentication process performed between the digital camera 510 and the CF 520 failed.

Figure 34:
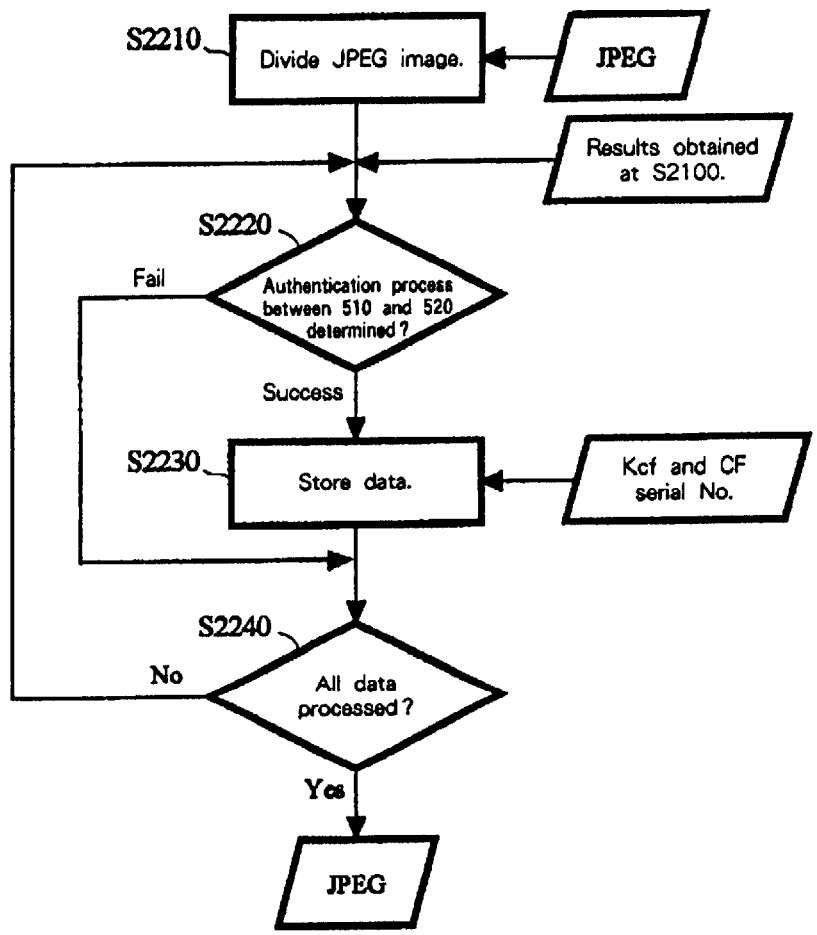
FIG. 34 is a detailed flowchart for the storing in a CF 520 of the results obtained at step S2200.

FIG. 34 is a detailed flowchart for step S2200 at which an image is retained in the CF 520.

When the authentication process performed between the digital camera 510 and the CF 520 is successful, the image generated by the digital camera 510 is stored in the CF 520 using the key Kcf. At step S2210, a JPEG image division step, the JPEG image generated by the digital camera 510 is divided to provide strings of 512 bytes each. At step S2220, an authentication step, an authentication process is performed between the components 510 and 520. When the authentication process at step S2100 fails, a series of 0s is written in the NAND area 521 of the CF 520. When the authentication process is successful, at step S2230 the key Kcf, which is stored in the ROM 523 in the CF 520, is used to store the image generated by the digital camera 510 in the NAND area 521. The calculations, for which RC4 is used, are performed using 512 byte data strings, which were prepared at step S2210, the serial number of the CF 520 and the key Kcf stored in the CF 520, and the series that is obtained is written in the NAND area 521 of the CF 520.

Figure 35:
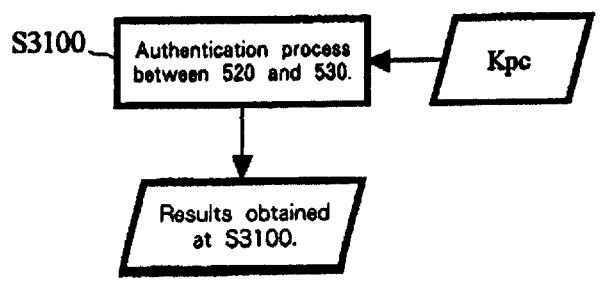
FIG. 35 is a flowchart for an authentication process performed at step S3000 by components 520 and 530.

FIG. 35 is a flowchart for the authentication process performed between the components 520 and 530 at step S3000.

At step S3100, an authentication step, the CF 520 and the CF driver 530 use the key Kpc to perform an authentication process and output the results.

Figure 36:
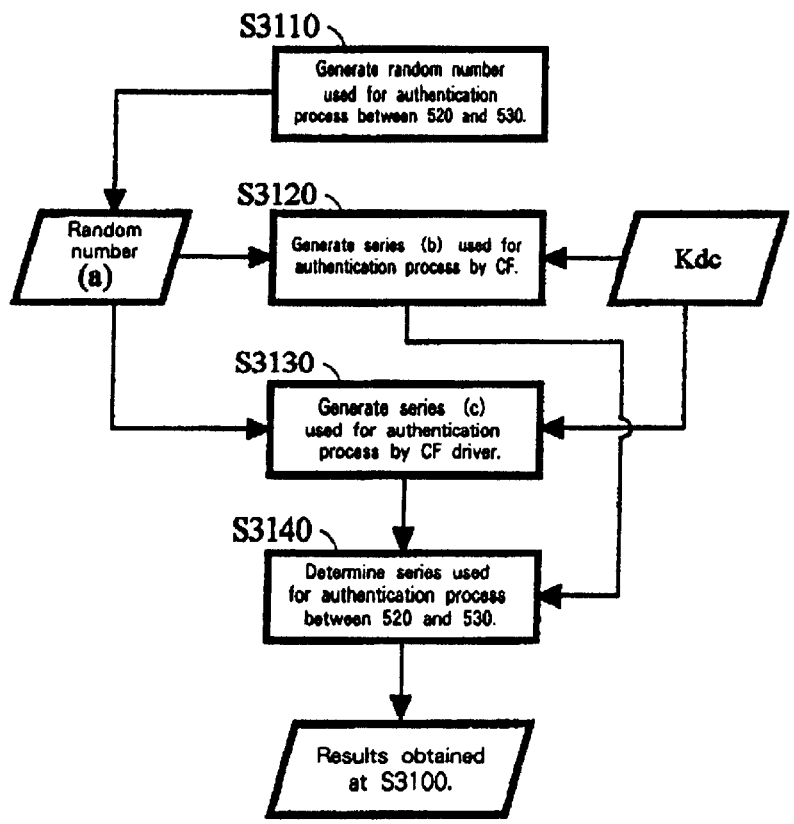
FIG. 36 is a detailed flowchart for an authentication process performed at step S3100 by components 520 and 530.

FIG. 36 is a detailed flowchart for the authentication process performed at step S3100 between the components 520 and 530.

A data set pair consisting of the user ID and the key Kpc of the CF 520 are stored in advance in the key database 570. The user ID and the key Kpc are stored in the NAND area 521 of the CF 520. At step S3110 a random number is generated for the performance of the authentication process by the components 520 and 530, and a random number (a) is generated for use by the CF driver 530 during the authentication process. At step S3120, a series generation step, RC4 is used to calculate a series (b) that is output using the key Kpc, which is stored in advance in the NAND area 521 of the CF 520, and the random number (a), which is generated at step S3110. At step S3130, a generation step for a series to be used for an authentication process, the CF driver 530 uses RC4 to produce a series (c), which is output using the key Kpc and the random number (a). At step S3140, at which a series comparison is made as part of an authentication process for the components 520 and 530, the CF driver 530 compares the series (b) obtained at step S3120 with the series (c) obtained at step S3130. When the two series correspond, a result message, "The authentication process performed between the CF 520 and the CF driver 530 was successful," is output. When the two series differ, a result message, "The authentication process performed between the CF 520 and the CF driver 530 was not successful," is output. Preferably, when the authentication process fails, the following authentication process is not performed, and a warning message, "Since the authentication process performed between a compact flash driver and a compact flash failed, the validity of this image can not be confirmed," appears on the screen when the image held by the CF 520 is displayed on the display device 100.

Figure 37:
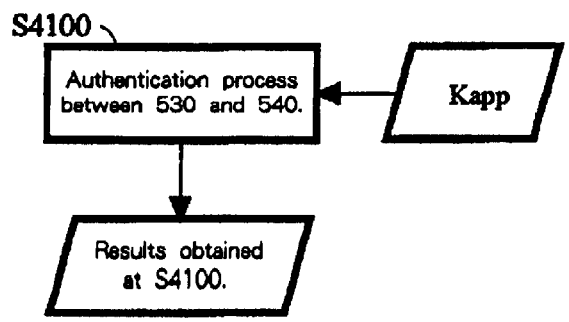
FIG. 37 is a flowchart for an authentication process performed at step S4000 by components 530 and 540.

FIG. 37 is a flowchart for the authentication process performed between the components 530 and 540 at step S4000.

At step S4100 the authentication process is performed by the components 530 and 540. The CF driver 530 and the JPEG image registration/storage application 540 use the key Kapp to perform the authentication process and output the result.

Figure 40:
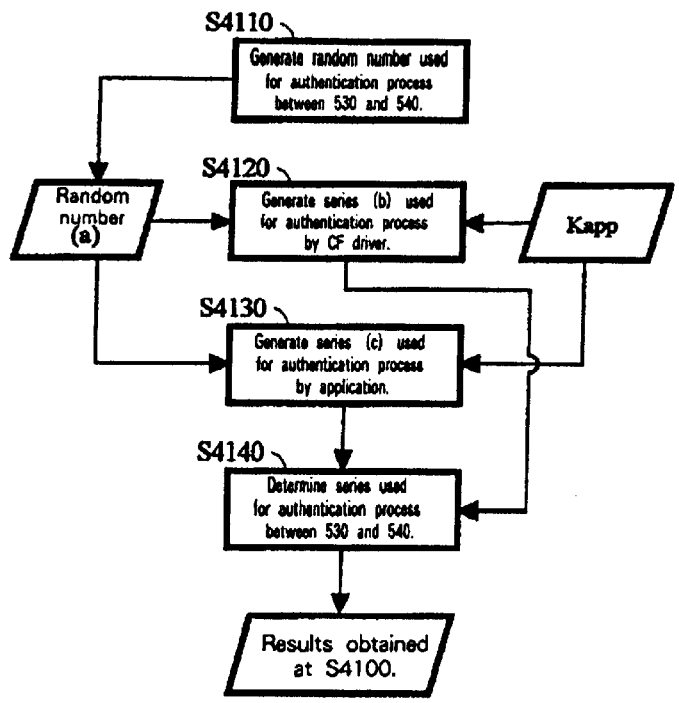
FIG. 40 is a detailed flowchart for an authentication process performed at step S4100 by components 530 and 540.

FIG. 40 is a detailed flowchart for the authentication process performed at step 54110 between the components 530 and 540.

At step S4100 a random number (a) is generated used by the application 540 for the authentication process. At step S4120 a series (b) is generated by the CF driver 530. The CF driver 530 uses RC4 to calculate the series (b), and uses the key Kapp to output it and the random number (a) obtained at step S4110. At step S4130 a series (c) is generated by the application 540. The application 540 uses RC4 to calculate the series (c), and uses the key Kapp and the random number (a) generated at step S4110 to output it. At step S4140, at which a comparison is made of the series used for the authentication process between the components 530 and 540, the series (b), calculated at step S4120, is compared with the series (c), calculated at step S4130. When the two series correspond, a result message, "The authentication process performed between CF driver 530 and the application 540 was successful," is output. When the two series differ, a result message, "The authentication process performed between the CF driver 530 and the application 540 was not successful," is output. Preferably, when the authentication process fails, the following authentication is not performed, and a warning message, "Since the authentication process performed between an application and a compact flash driver failed, the validity of this image can not be confirmed," appears on the screen when the image held by the CF 520 is displayed on the display device 100. When an image selected by a user for registration in the database is an image for which the validity could not be confirmed, a remark, "an image for which the validity could not be confirmed before registration" (i.e., the location of the image could not be confirmed), is included in the information that is to be embedded as an electronic watermark in the image.

Figure 38:
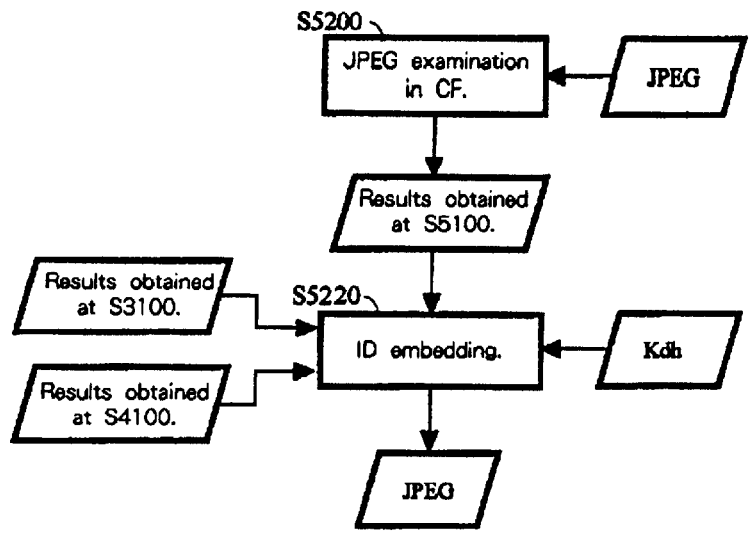
FIG. 38 is a flowchart for the embedding of an ID at step S5000.

FIG. 38 is a flowchart for the ID embedding process performed at step S5000.

At step S5200 a JPEG examination is performed in the CF 520. The examination is performed to determine whether the JPEG image stored in the CF 520 was altered. At step S5200, an ID embedding step, a data embedding/extraction key (Kdh) is used to embed, as an electronic watermark, an image ID (ID information) in the JPEG image.

Figure 39:
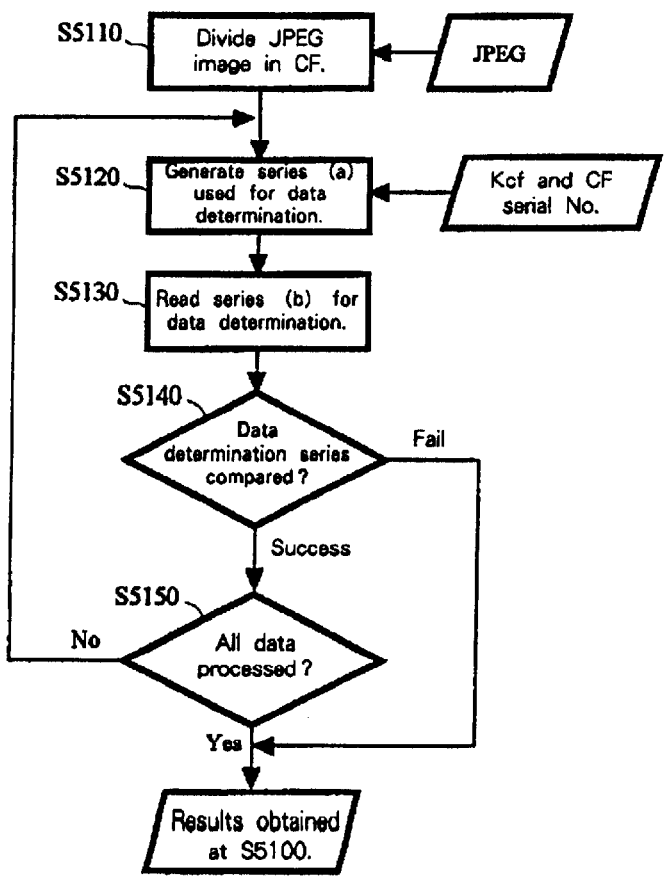
FIG. 39 is a detailed flowchart for a JPEG examination performed in the CF 520 at step S5100.

FIG. 39 is a detailed flowchart for the JPEG examination performed for the CF 520 at step S5100.

At step S5110 a JPEG image division is performed for the CF 520; the JPEG image stored in the CF 520 is divided into strings of 512 bytes each. At step S5120, a step for the generation of a series used for data determination, the application 540 uses RC4 to produce a series (a), for which the 512-byte data strings obtained at step S5110, the serial number stored in the NAND area 521 of the CF 520, and the key Kcf stored in the ROM 523 of the CF 520 are used, and outputs the series. At step S5130, a step at which a series used for data determination is read, a series (b), stored in the NAND area 521 of the CF 520, is read and output. At step S5140, a step at which a comparison is performed for the series used for data determination, the series (a), produced at step S5120, is compared with the series (b), output at step S5130. If the two series correspond, the results message, "512 bytes of the data were altered," is output, and the next string of data is processed. If the two series differ, the result message, "Since 512 bytes of the data were altered, the pertinent JPEG data were altered," is output.

Figure 41:
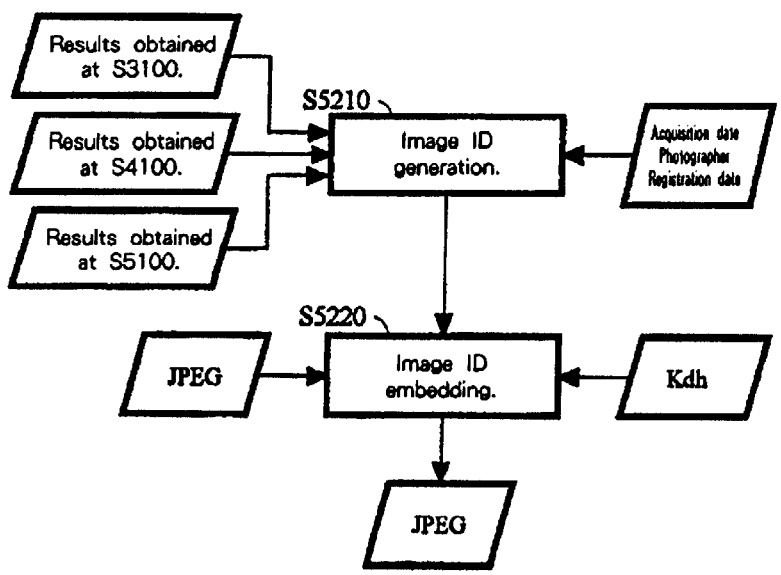
FIG. 41 is a detailed flowchart for the embedding of an ID at step S5200.

FIG. 41 is a detailed flowchart for the ID embedding process performed at step S5200.

At step S5210, a step for the generation of an image ID, data (an image ID) to be embedded as an electronic watermark in the JPEG image are generated. The image ID is a series generated using the authentication process history information obtained at steps S3100, S4100 and S5100, the photograph acquisition date, the photographer (a user ID), the registration date, and the photographic device (a digital camera ID). The authentication process history information represents the history of the authentication processes performed in the past, and includes information as to whether the authentication processes performed by the components, beginning with the digital camera 510 and ending with the application 540, were all successful, and information as to whether the JPEG image stored in the CF 520 was altered. When the authentication process history information is extracted, a process at which the authentication process failed (a process at which it was found an alteration was performed) is identified. At step S5220, an image ID embedding step, the data embedding/extraction key (Kdh) is used to embed the image ID, as an electronic watermark, in the JPEG image, and the obtained JPEG image is output.

Figure 42:
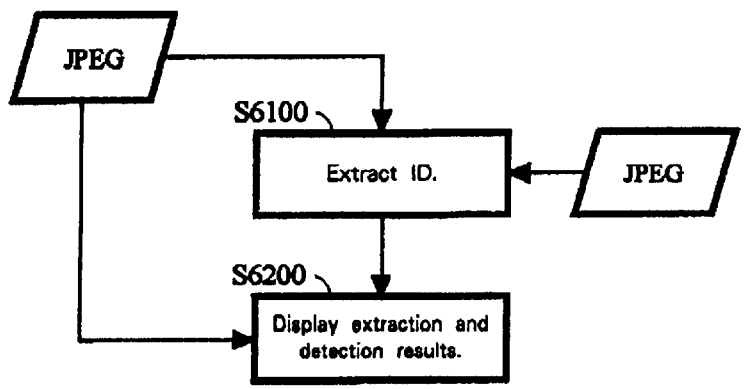
FIG. 42 is a flowchart for an ID extraction/detection performed at step S6000.

FIG. 42 is a detailed flowchart for the ID extraction/detection process performed at step S6000.

At step S6100, an ID extraction step, the data embedding/extraction key (Kdh) is used- to extract the image ID from the JPEG image. At step S6200, a display step for the extraction/detection results, the ID, the results of the alteration examination, and an altered portion (if one is found) are displayed with the JPEG image.

Figure 43:
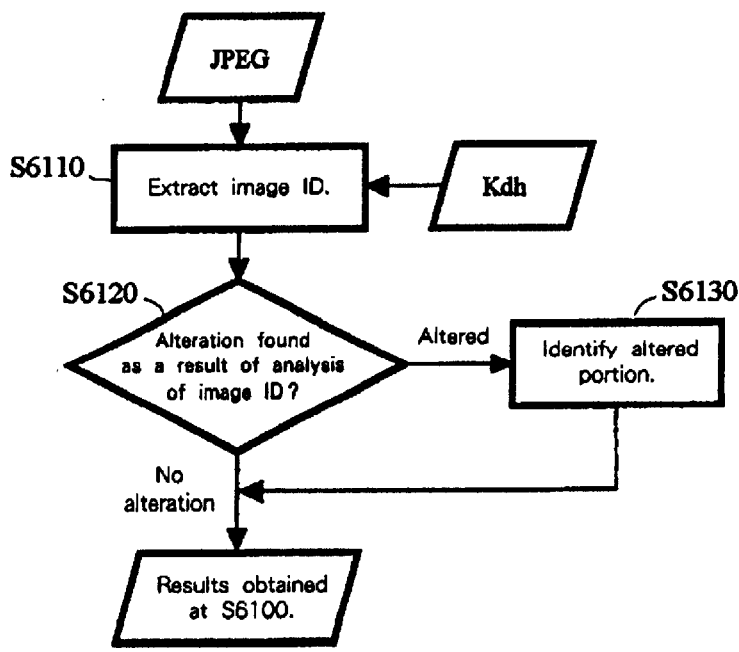
FIG. 43 is a detailed flowchart for an ID extraction performed at step S6100.

FIG. 43 is a detailed flowchart for the ID extraction process performed at step S6100.

At step S6110, an image ID extraction step, the data (the image ID) embedded, as an electronic watermark, in the JPEG image are extracted using the data embedding/extraction key (kdh). At step S6120, a step for the analyzation of the image ID and for the alteration determination, the authentication process history information, the acquisition date, the photographer, the registration date and the photographic device are obtained from the results provided at step S6110, and, in addition, the electronic watermark is used to determine whether the image contains an altered portion. If an altered portion is found, program control moves to step S6130 to identify the altered portion. If no altered portion is found, the results (the authentication process history information, the acquisition date, the photographer, the registration date and the photographic device) are output. At step S6130, a step for identifying an altered portion, if an altered portion was found at step S6120, that portion is identified and changed into a binary image. The obtained binary image is then output with the results obtained at step S6120 (the authentication process history information, the acquisition date, the photographer, the registration date and the photographic device).

Insurance Operation

Figure 44:
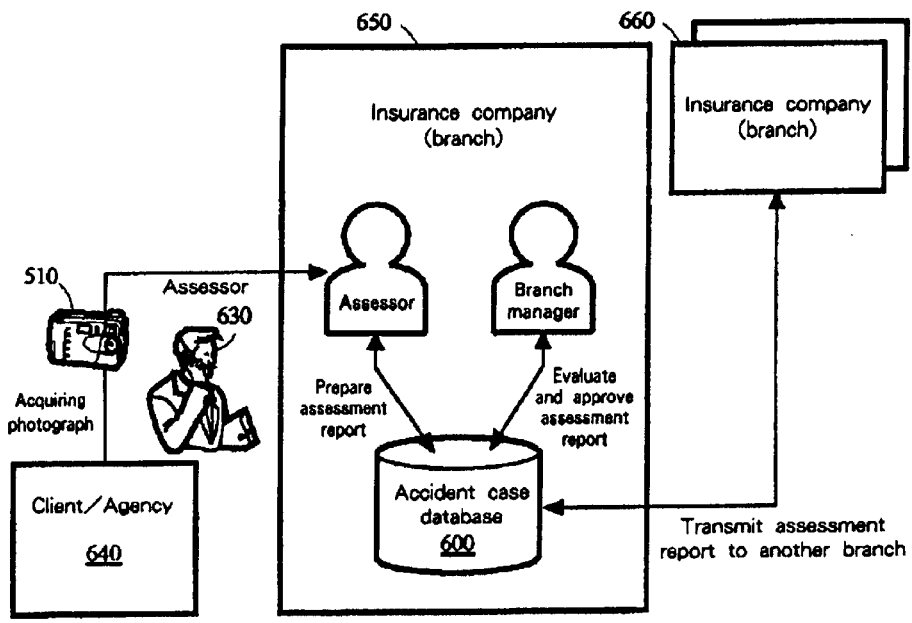
FIG. 44 is a diagram illustrating the outline of a claim service and a damage assessment operation that use the data judging apparatus of the present invention.

FIG. 44 is a outline diagram of a claim service and a damage assessment operation that use the data judging apparatus of the present invention.

The present invention can be applied for a damage assessment operation whereby, when the property of an insured person is damaged and a contractor requests that under the terms of a non-life insurance policy an insurance company pay for the property damage, the insurance company conducts a damage assessment investigation, and based on the investigation, prepares and pays a specified amount. When the data judging apparatus of the present invention is used, a digital photograph obtained as evidence, to substantiate a property damage assessment, can be prevented from being altered or substituted, and the damage assessment operation can be performed safely and efficiently. In addition, its use for damage assessment purposes, the present invention can also be applied for various other operations, such as when photographs to be used as evidence are taken of objects and construction in process at civil engineering and construction sites, or when photographs are taken to be used for official real estate management, for environmental development and safety projects, and for disaster countermeasure planning.

The outline of the damage assessment operation in FIG. 44 will not be explained by using automobile insurance as an example. When an insurance company 660 receives a report of an automobile accident from an insured client or from his or her agency 640, the insurance company 660 immediately notifies an insurance branch office 650 to assume responsibility for the processing required for the accident. Then, to perform the damage investigation, the branch manager assigns an assessor 630 who examines the damaged vehicle at a repair facility, uses a digital camera to take pictures of the damage for evidence, and prepares a damage assessment. Thereafter, the assessor 630 uses a PC to prepare a detailed assessment report to which, as evidence, a case photo file is attached. The assessor 630 then submits the assessment report to the branch manager for approval, and also registers the report in an accident case database 600. Subsequently, the branch manager evaluates and approves the case submitted by the assessor 630, and pays the assessed damage amount.

Insurance Operation Process

Figure 45:
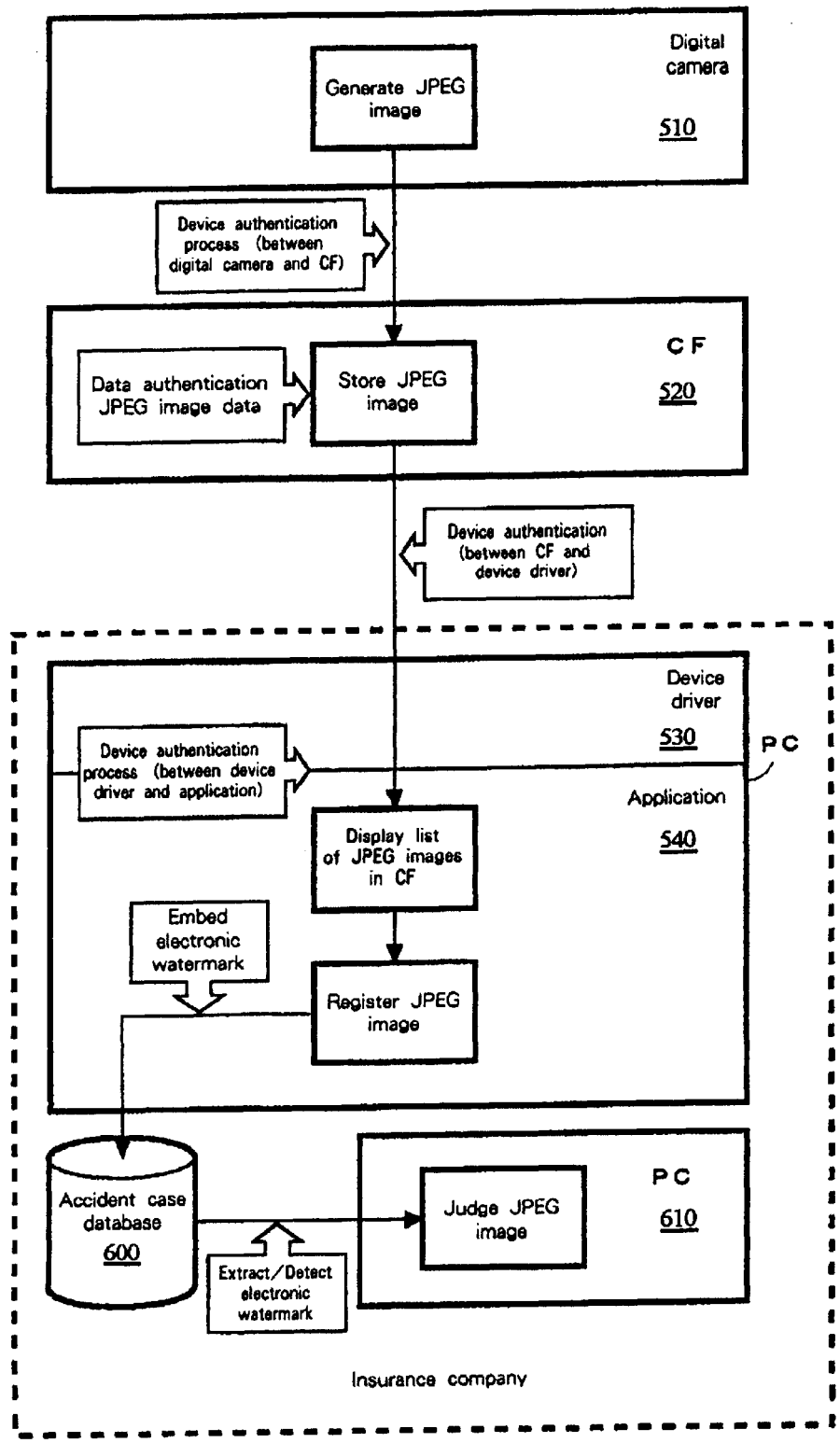
FIG. 45 is a diagram showing the damage assessment process that uses the method of the present invention.

The damage assessment process using the method of the present invention is shown in FIG. 45.

First, a photograph taken by the assessor 630 with the digital camera 510 is changed into a JPEG image in the digital camera 510. The JPEG image is then authenticated by the digital camera 510 and the compact flash 520, and is stored. Later, the assessor 630 selects, from a list, all the JPEG images stored in the CF 520 that are to be used as evidence, and registers the photographs using the damage assessment application 540. When the JPEG image list is displayed, an authentication process is performed by the CF 520 and the CF driver 530 and by the CF driver 530 and the damage assessment application 540. In addition, whether all the JPEG images stored in the CF 520 were input legally is determined by the authentication process performed by the digital camera 510 and the CF 520, and the results are displayed. The assessor 630 then refers to the results and selects a photograph to be registered as evidence in the accident case. Therefore, it can be confirmed that a JPEG image is valid. If the results of an authentication process are not obtained or the authentication process fails for a specific photograph, it may be possible that another photograph image altered by the PC was written in the CF 520. Thus, so long as this photograph will not be used for the following operation, an illegal activity can be prevented. The JPEG photograph selected by the assessor 630 is stored in the accident case database 600, and at this time, an alteration detection mark, used as an electronic watermark, and an image ID, which is formed using the acquisition date, the registration date, the photographer, the authentication process history information and the device used, are embedded in the JPEG image data. Then, when the insurance company manager evaluates the JPEG photograph stored in the damage assessment application 540, the alteration of the JPEG photograph is detected using the electronic watermark, and the image ID is extracted. The results are then displayed by the damage assessment application 540, and if the JPEG photograph was altered after it was registered, the altered portion is also displayed. The PC for detecting the alteration may be the same as the data embedding PC, or may be a remote PC 610 connected by a communication line.

Figure 47:
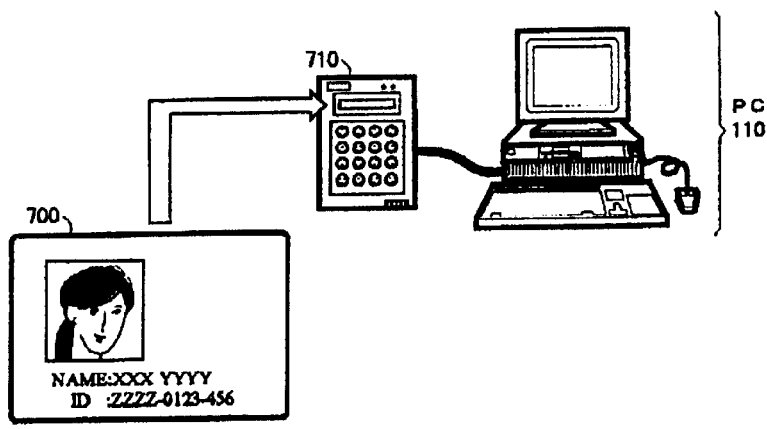
FIG. 47 is a schematic diagram showing a smart card and a smart card reader according to the present invention.

The present invention can be easily applied for an identification system. FIG. 47 is a diagram showing a smart card for which the present invention is used. The name and the ID number of the owner are recorded on the surface of a smart card 700. Preferably, a photographic image of the owner is printed. The features of a smart card 700 are that data for identifying an owner are embedded as an electronic watermark in the memory area on the smart card 700, and that, since the alteration detection data of this invention for specifying an altered portion are used as the electronic watermark, an alteration or an altered portion can be detected and identified. According to the identification data detection method, a smart card 700 is read by a smart card reader 710 to obtain identification data for an owner in which alteration detection data are embedded. The extracted alteration detection data are used to determine whether the identification data were altered, and when the identification data were altered, the altered portion is identified. The identification data are personal bibliographical data and biological characteristic data. Electronic data, such as a fingerprint, a voiceprint, an iris or a retina scan, are stored on the smart card 700 as an electronic watermark, which includes the alteration detection data of the present invention. The smart card reader 710 reads the electronic data to detect an alteration, and when an alteration is found, the altered portion is identified. Preferably, if no alteration is found, the information read by the smart card reader 710 is compared with information entered by a customer at a counter, and thereafter, the identification process is completed.

Modifications of Content Data Judging Apparatus

Figure 27:
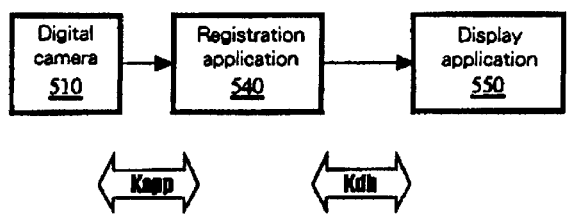
FIG. 27 is a diagram showing a data judging apparatus wherein a digital camera 510 is connected as an accessory to a PC.

Other modifications of the data judging apparatus of the present invention will now be described. FIG. 27 is a diagram showing a simpler data judging apparatus than that in FIG. 26 (a digital camera 510 is connected to the PC as an accessory). A registration application 540 embeds a JPEG ID (electronic watermark) in a JPEG image using a key (Kdh), and stores the resultant JPEG image on a hard disk. A display application 550 extracts the ID from the JPEG image, determines whether the JPEG image was altered, and displays the results of the detection. If an altered portion is found, the altered portion is identified and displayed.

Figure 28:
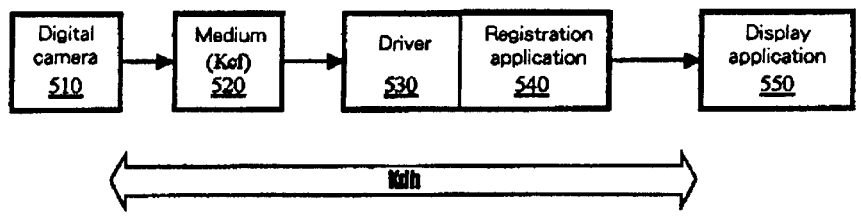
FIG. 28 is a diagram of a case where electronic watermark embedding is performed in the digital camera 510.

FIG. 28 is a diagram showing an example for embedding an electronic watermark in the digital camera 510 in FIG. 26.

A JPEG ID (electronic watermark) is embedded in a JPEG image acquired by the digital camera 510 using a key (Kdh). The JPEG image, which is stored in a storage medium 520, is then transmitted via a driver 530, and at a PC is stored on a hard disk by a registration application 540. A display application 550 extracts the ID from the JPEG image, determines whether the JPEG image was altered, and displays the results. If an alteration is found, an altered portion is identified and displayed. While the authentication process and the electronic watermark are protected by the above mentioned key, secrecy can be improved if tamper proof components are used.

Figure 29:
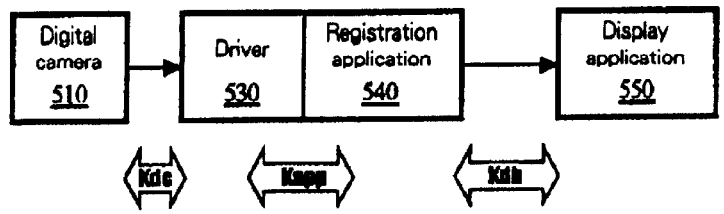
FIG. 29 is a diagram of a case where the digital camera 510 is connected directly to a PC by a cable.

FIG. 29 is a diagram showing an example where the digital camera 510 in FIG. 26 is connected directly to a PC by a cable. A JPEG image acquired by the digital camera 510 is protected by authentication processes performed by components 510 and 530 using the key (Kpc), and by components 530 and 540 using the key (Kapp). A registration application 540 embeds a JPEG ID (electronic watermark) in the JPEG image using the key (Kdh), and stores the obtained JPEG image on the hard disk. A display application 550 extracts the ID from the JPEG image, performs an alteration determination, a nd displays the results. If an alteration is found, an altered portion is identified and displayed. While the authentication process and the electronic watermark are protected by the mentioned above keys, secrecy can be improved if tamper proof components are used.

Figure 30:
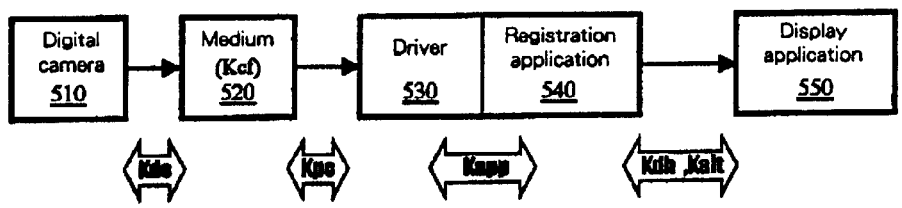
FIG. 30 is a diagram showing a more flexible data judging apparatus.

FIG. 30 is a diagram showing a more flexible data judging apparatus. A JPEG image acquired by a digital camera 510 is protected by authentication processes performed by components 510 and 520 using the key (Kdc), by components 520 and 530 using the key (Kpc), and by components 530 and 540 using the key (Kapp). A registration application 540 uses the keys (Kdh and Kalt) to respectively embed a JPEG ID (electronic watermark) and an alteration detection mark (electronic watermark) in the JPEG image, and stores the obtained JPEG image on the hard disk. A display application 550 extracts the ID from the JPEG image, performs an alteration determination, and displays the results. If an alteration is found, an altered portion is identified and displayed. The important process here the embedding of an ID in the JPEG image using a key (Kalt) that is calculated using a hash value obtained from the JPEG image data. When the value of the key (Kalt) is compared with the hash value calculated using the JPEG image data, whether the image data were altered can be determined immediately. Since only the alteration determination is performed quickly with this key (Kalt), the processing speed when no alteration is found can be increased. It should be noted that if an alteration is found an altered portion is identified by using the key (Kdh), as is done in the other case. While the authentication process and the electronic watermark are protected by the above mentioned keys, secrecy can be improved if tamper proof components are used.

Advantages of the Invention

As is described above, according to the data judging apparatus and the method of the present invention, since appropriate authentication processes are performed by a plurality of apparatuses that are involved from the time the content data are prepared until the alteration determination is performed, not only can an alteration of content data be found and an altered portion identified, but also the reliability of the content data can be considerably increased. That is, a system for maintaining security is provided, so that image data or audio data that are produced by a digital device, such as a digital camera or a digital recorder, can be used as evidence.

The above described invention may be embodied in many specific forms without departing from the invention therefore, it should be understood that the present invention should not be limited to the structures that have been described, but should include the spirit and scope of the present claims.

What is claimed is:

1. A content data judging apparatus, which determines whether a content data image prepared by a digital device was altered, comprising:

(1) means for performing an authentication process using a medium on which content data are recorded and embedded with data for verifying pertinent content data wherein the content data image is divided into the segments or blocks arranged in pairs in which the data for verifying content is placed in bits selected by a random number sequence selected by a secret key;

(2) means for reading said content data from said medium;

(3) means for embedding, in said content data, the data for verifying the pertinent contents wherein said means (3) for embedding includes embedding the data for varying content in selected luminance element bit positions in segments of the content data images while the chroma bits are not changed, and wherein the embedding means adjusts the values of the coefficients ($A_1, A_2, B_1, B_2, C_1$ and $C_2$) selected from the two blocks in each pair I so that the relationship corresponds to the rules 1-1 and 1-2 herein below and is in accordance with the bit values of the data that corresponds to the individual pairs:

When the bit value of data corresponding to a pair is 1:
   $(A_1<A_2 \&\& B_1<B_2 \&\& C_1<C_2)$II
   $(A_1>A_2 \&\& B_1>B_2 \&\& C_1<C_2)$II
   $(A_1<A_2 \&\& B_1>B_2 \&\& C_1>C_2)$II
   $(A_1>A_2 \&\& B_1<B_2 \&\& C_1>C_2)$ . . . . (rule 1-1)

When the bit value of data corresponding to a pair is 0:
   $(A_1<A_2 \&\& B_1<B_2 \&\& C_1>C_2)$II
   $(A_1>A_2 \&\& B_1<B_2 \&\& C_1<C_2)$II
   $(A_1<A_2 \&\& B_1>B_2 \&\& C_1<C_2)$II
   $(A_1>A_2 \&\& B_1>B_2 \&\& C_1>C_2)$ . . . . (rule 1-2)

wherein in the rules 1-1 and 1-2, X&&Y means both conditions X and Y are satisfied, and XIIY means either condition X or Y is satisfied;

(4) means for extracting, from said content data, said data for verifying the pertinent contents; and (5) means for using the results of the extraction to determine whether said content data were altered by displaying as part of the content data image indicia indicating any portion of the image containing altered content data.

2. The content data judging apparatus according to claim 1, wherein said content data recorded in said medium includes the results of an authentication process performed for said digital device and said medium, and wherein said means (2) for reading said content data includes means for reading the results of said authentication process.

3. The content data judging apparatus according to claim 1, wherein said means (3) for embedding data for verifying said content data includes means for embedding, in said content data, authentication history information for content data and ID information, such as a creation date, a creator, a creating device and a registration date.

4. A computer program product on a computer usable medium embedding alteration detection data in an image of content data prepared by a digital device comprising:

(1) software for performing an authentication process for a recording medium on which content data are recorded wherein the content data image is divided into the segments or blocks arranged in pairs in which the data for verifying content is placed in bits selected by a random number sequence selected by a secret key;

(2) software for reading said content data from said recording medium; and (3) software for embedding, in only one of luminance or chroma bits of segments of said content data, alteration detection data for identifying on the image of content data any portion containing altered data, and for recording the resultant content data on a storage device wherein said software for embedding includes embedding the data for verifying contents in selected element bit positions in segments of the content data image while the chroma bits are not changed and wherein the embedding adjusts the values of the coefficients ($A_1, A_2, B_1, B_2, C_1$ and $C_2$) selected from the two blocks in each pair I so that the relationship corresponds to the rules 1-1 and 1-2 herein below and is in accordance with the bit values of the data that corresponds to the individual pairs:

When the bit value of data corresponding to a pair is 1:
   $(A_1<A_2 \&\& B_1<B_2 \&\& C_1<C_2)$II
   $(A_1>A_2 \&\& B_1>B_2 \&\& C_1<C_2)$II
   $(A_1<A_2 \&\& B_1>B_2 \&\& C_1>C_2)$II
   $(A_1>A_2 \&\& B_1<B_2 \&\& C_1>C_2)$ . . . . (rule 1-1)

When the bit value of data corresponding to a pair is 0:
   $(A_1<A_2 \&\& B_1<B_2 \&\& C_1>C_2)$II
   $(A_1>A_2 \&\& B_1<B_2 \&\& C_1<C_2)$II
   $(A_1<A_2 \&\& B_1>B_2 \&\& C_1<C_2)$II
   $(A_1>A_2 \&\& B_1>B_2 \&\& C_1>C_2)$ . . . . (rule 1-2)

wherein in the rules 1-1 and 1-2, X&&Y means both conditions X and Y are satisfied, and XIIY means either condition X or Y is satisfied.

5. A computer program product on a computer usable medium of claim 4 including:

(1) a software for extracting alteration detection data from content data; and (2) a software for using the results of an extraction to determine whether said content data were altered, and when said content data were altered, display an image of the content data identifying on the image those portions containing altered data.

6. A computer program product according to claim 4, wherein said content data recorded in said medium includes the results of an authentication process performed for said digital device and said medium, and wherein said reading said content data includes reading the results of said authentication process.

7. A computer program product according to claim 4, wherein said means (3) for embedding data for verifying said content data includes embedding, in said content data, authentication history information for content data and ID information, such as a creation date, a creator, a creating device and a registration date.

* * * * *